US012354535B2

(12) United States Patent
Kuang et al.

(10) Patent No.: US 12,354,535 B2
(45) Date of Patent: Jul. 8, 2025

(54) DISPLAY PANEL, DRIVING METHOD THEREFOR AND DISPLAY APPARATUS

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Jian Kuang, Wuhan (CN); Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/627,758

(22) Filed: Apr. 5, 2024

(65) Prior Publication Data

US 2024/0249672 A1 Jul. 25, 2024

(30) Foreign Application Priority Data

Apr. 20, 2023 (CN) ........................ 202310430578.X

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/045* (2013.01)

(58) Field of Classification Search
CPC .. G09G 3/3233; G09G 3/3266; G09G 3/3291; G09G 3/3258; G09G 3/3225; G09G 3/30; G09G 3/20; G09G 3/32; G09G 3/3208; G09G 3/3275; G09G 2300/0819; G09G 2300/0842; G09G 2300/0861; G09G 2300/0852; G09G 2300/0426; G09G 2300/043; G09G 2300/0866; G09G 2300/0809; G09G 2320/043; G09G 2320/0233; G09G 2320/045; G09G 2320/0295; G09G 2310/08; G09G 2310/0251; G09G 2310/0262; G09G 2310/0286; G09G 2310/061
See application file for complete search history.

(56) References Cited

U.S. PATENT DOCUMENTS

2021/0383743 A1* 12/2021 Yuan ........................ G09G 3/32
2022/0335872 A1* 10/2022 Zhang ....................... G09G 3/20
2024/0078972 A1* 3/2024 Zhang ....................... G09G 3/32

* cited by examiner

*Primary Examiner* — Dong Hui Liang
(74) *Attorney, Agent, or Firm* — KDW Firm PLLC

(57) ABSTRACT

A display panel includes pixel circuits and light-emitting elements. A driving module in a pixel circuit is configured to provide a driving current for a light-emitting element in a light emission stage. A bias adjustment module is configured to provide a bias adjustment signal for a driving transistor of the driving module in a bias adjustment stage. A first non-light emission stage includes the bias adjustment stage. In the same first non-light emission stage, time between an end moment of the bias adjustment stage and an end moment of the first non-light emission stage is a bias maintaining stage. The brightness of the display panel in the first mode is different from that in the second mode. At least one of a duration of the bias adjustment stage and a duration of the bias maintaining stage in the first mode is different from the corresponding one in the second mode.

20 Claims, 18 Drawing Sheets

DISPLAY PANEL, DRIVING METHOD THEREFOR AND DISPLAY APPARATUS

This application claims priority to Chinese Patent Application No. 202310430578.X filed Apr. 20, 2023, the disclosure of which is incorporated herein by reference in its entirety.

TECHNICAL FIELD

The present disclosure relates to the field of display techniques and, in particular, to a display panel, a driving method for a display panel, and a display apparatus.

BACKGROUND

A display panel is generally provided therein with pixel circuits and light-emitting elements, and a driving transistor in each pixel circuit can provide a driving current for a respective light-emitting element according to a data signal received by the driving transistor, to drive the light-emitting element to emit light, so that the display panel presents a corresponding display image.

However, internal characteristics of the driving transistor in the pixel circuit slowly change over time, so that shift occurs in a threshold voltage of the driving transistor, and threshold voltage shift situations of the driving transistor are also different at different display brightnesses, thereby adversely affecting the display uniformity of the display panel.

SUMMARY

A display panel, a driving method for a display panel, and a display apparatus are provided according to the present disclosure. Different degrees of bias adjustment are performed on the driving transistors in different brightness modes to improve the display uniformity of the display panel in different brightness modes.

According to an aspect of the present disclosure, a display panel is provided, which includes: pixel circuits and light-emitting elements.

A pixel circuit of the pixel circuits includes a driving module and a bias adjustment module.

The driving module is configured to provide a driving current for a light-emitting element of the light-emitting elements in a light emission stage; and the driving module includes a driving transistor.

The bias adjustment module is configured to provide a bias adjustment signal for a source and/or drain of the driving transistor in a bias adjustment stage.

Time of one frame image of the display panel includes at least one light emission stage and at least one non-light emission stage; and at least a part of at least one non-light emission stage is a first non-light emission stage.

The first non-light emission stage includes the bias adjustment stage; and in the same first non-light emission stage, time between an end moment of the bias adjustment stage and an end moment of the first non-light emission stage is a bias maintaining stage.

Operation modes of the display panel include a first mode and a second mode; and a brightness of the display panel in the first mode is different from a brightness of the display panel in the second mode.

At least one of a duration of the bias adjustment stage and a duration of the bias maintaining stage in the first mode is different from the corresponding one in the second mode.

According to another aspect of the present disclosure, a driving method for a display panel is provided, and the display panel includes pixel circuits and light-emitting elements. A pixel circuit of the pixel circuits includes a driving module and a bias adjustment module. The driving module is configured to provide a driving current for a light-emitting element of the light-emitting elements at a light emission stage; and the driving module includes a driving transistor. The bias adjustment module is configured to provide a bias adjustment signal for a source and/or a drain of the driving transistor at a bias adjustment stage. The time of one frame image of the display panel includes at least one light emission stage and at least one non-light emission stage; at least a part of at least one non-light emission stage is a first non-light emission stage. The first non-light emission stage includes the bias adjustment stage; and in the same first non-light emission stage, time between an end moment of the bias adjustment stage and an end moment of the first non-light emission stage is a bias maintaining stage. The driving method for the display panel includes as follows.

An operation mode of the display panel is acquired; and the operation mode includes at least a first mode and a second mode that are different in brightness.

A duration of the bias adjustment stage and a duration of the bias maintaining stage are determined according to the operation mode. In a case where the operation mode of the display panel is the first mode and in a case where the operation mode of the display panel is the second mode, at least one of the durations of the bias adjustment stages and the durations of the bias maintaining stages is different.

The time for the bias adjustment module to provide a bias adjustment signal to the source and/or drain of the driving transistor is controlled according to the duration of the bias adjustment stage and the duration of the bias maintaining stage.

According to yet another aspect of the present disclosure, a display apparatus is provided, which includes the foregoing display panel including pixel circuits and light-emitting elements. A pixel circuit of the pixel circuits includes a driving module and a bias adjustment module. The driving module is configured to provide a driving current for a light-emitting element of the light-emitting elements in a light emission stage; and the driving module includes a driving transistor. The bias adjustment module is configured to provide a bias adjustment signal for a source and/or drain of the driving transistor in a bias adjustment stage. Time of one frame image of the display panel includes at least one light emission stage and at least one non-light emission stage; and at least a part of at least one non-light emission stage is a first non-light emission stage. The first non-light emission stage includes the bias adjustment stage; and in the same first non-light emission stage, time between an end moment of the bias adjustment stage and an end moment of the first non-light emission stage is a bias maintaining stage. Operation modes of the display panel include a first mode and a second mode; and a brightness of the display panel in the first mode is different from a brightness of the display panel in the second mode. At least one of a duration of the bias adjustment stage and a duration of the bias maintaining stage in the first mode is different from the corresponding one in the second mode.

It is to be appreciated that the contents described in this part are not intended to identify key or important features of the embodiments of the present disclosure, and are not intended to limit the scope of the present disclosure. Other features of the present disclosure will become readily appreciated through the description hereinafter.

BRIEF DESCRIPTION OF DRAWINGS

To illustrate technical solutions in embodiments of the present disclosure more clearly, drawings used in description of the embodiments are briefly described hereinafter. Apparently, the drawings described below merely illustrate some embodiments of the present disclosure, and the person of ordinary skill in the art can obtain other drawings based on these drawings on the premise that no creative efforts are made.

DETAILED DESCRIPTION

Figure 1:
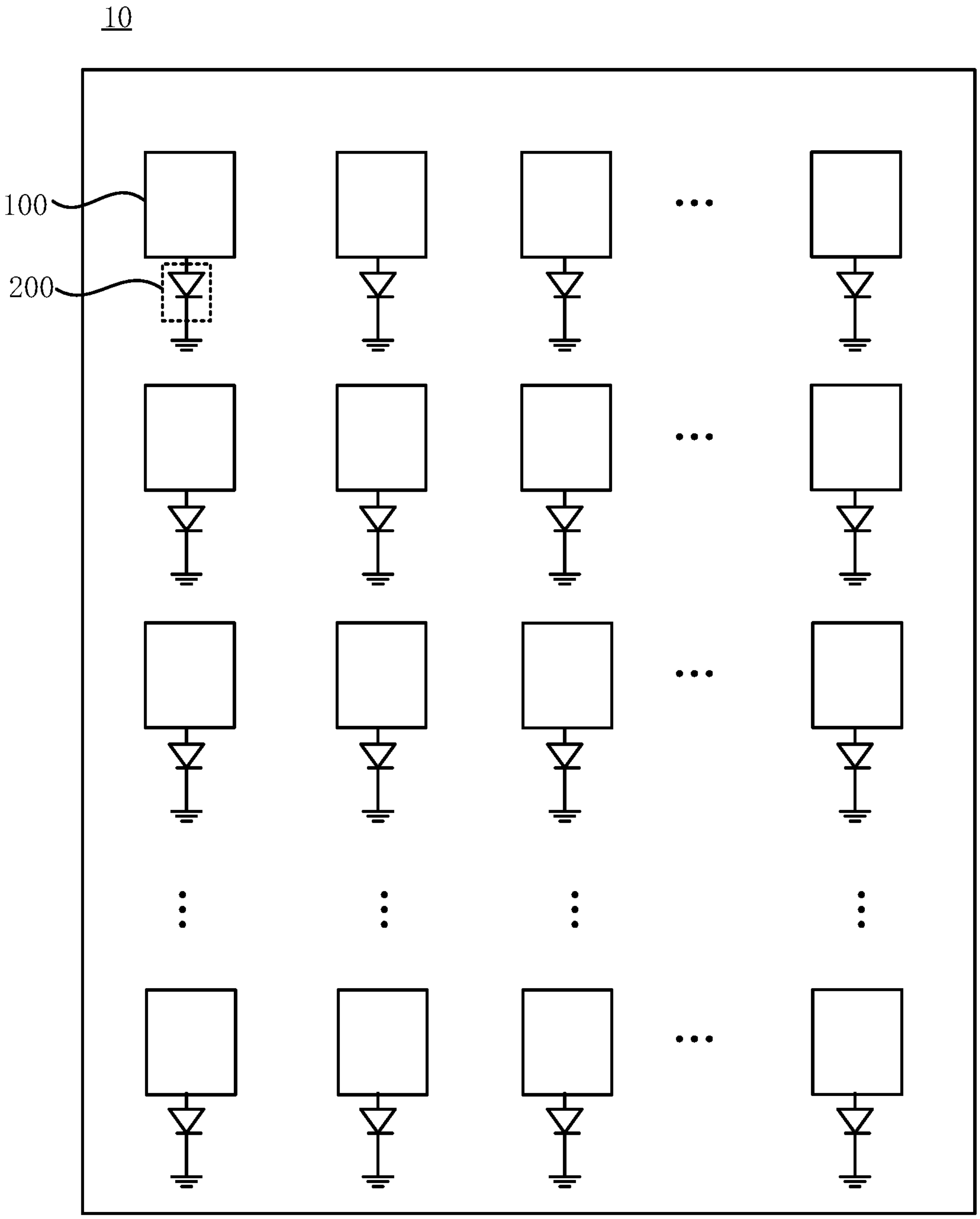
FIG. 1 is a schematic structural diagram of a display panel according to an embodiment of the present disclosure.

For enabling the person skilled in the art to better understand the solutions of the present disclosure, the technical solutions in embodiments of the present disclosure are described clearly and completely in conjunction with the drawings in embodiments of the present disclosure. Apparently, the embodiments described below are part, rather than all, of the embodiments of the present disclosure. Based on the embodiments in the present disclosure, all other embodiments obtained by the person skilled in the art on the premise that no creative efforts are made are within the scope of the present disclosure.

It is to be noted that the terms "first", "second" and the like in the description, claims and the above drawings of the present disclosure are intended to distinguish between similar objects and are not necessarily used to describe a particular order or sequence. It is to be appreciated that the data used in this way is interchangeable where appropriate so that the embodiments of the present disclosure described herein may also be implemented in a sequence besides those sequences illustrated or described herein. Furthermore, terms such as "include", "have"; and any deformation thereof, are intended to cover non-exclusive inclusion, e.g., a process, method, system, product, or device including a series of steps or units is not necessarily limited to those steps or units expressly listed, but may include other steps or units not expressly listed or inherent to such process, method, system, product or device.

A self-light emitting display panel includes pixel circuits and light-emitting elements, and a pixel circuit of the pixel circuits includes a driving transistor. A data signal is provided to a gate of the driving transistor, and the driving transistor converts the data signal into a driving current so as to drive a light-emitting element of the light-emitting elements to emit light. However, when the driving transistor is turned on, for the driving transistor being of a PMOS-type transistor, there may be a case in which a gate potential of the PMOS-type transistor is higher than a drain potential of the PMOS-type transistor; and for the driving transistor being of an NMOS-type transistor, there may be a case in which a gate potential of the NMOS-type transistor is lower than a drain potential of the NMOS-type transistor, and if the driving transistor is maintained in this state for a long time, ions inside the driving transistor are polarized, so that a built-in electric field is formed inside the driving transistor, resulting in constant shifting of a threshold voltage of the driving transistor, so that the driving transistor is biased, therefore, stability of the driving current provided by the driving transistor is adversely affected, and light emission stability of the light-emitting element is further adversely affected.

Furthermore, when the display panel presents different display brightnesses, the data signals provided for the driving transistor may be different, or the durations of light emission performed by the light-emitting element may be different, causing different bias situations of the driving transistor, that is, different threshold voltage shift situations of the driving transistor, therefore, the display uniformity of the display panel in different display brightnesses is adversely affected, and further the display effect of the display panel is adversely affected.

To address the above technical issues, a first non-light emission stage according to the embodiments of the present disclosure includes a bias adjustment stage and a bias maintaining stage, and in the bias adjustment stage and the bias maintaining stage, it is ensured that the voltage difference between the source and/or drain of the driving transistor and the gate of the driving transistor is just the voltage difference between the bias adjustment signal and the gate of the driving transistor, to be different from the voltage difference between the source and/or drain of the driving transistor and the gate of the driving transistor in the light emission stage, thereby, in the bias adjustment stage and the bias maintaining stage, realizing the bias adjustment to the driving transistor, improving the situation that since the voltage difference between the source and/or drain of the driving transistor and the gate of the driving transistor keeps constant for a long term, the ions internal the driving transistor are polarized and threshold voltage shift occurs. In addition, when the display panel is in different modes, the display panel presents different display brightnesses, and when the display panel presents different display brightnesses, the gate voltages of the driving transistor are different. In this case, by controlling at least one of the bias adjustment stages and the bias maintaining stages in different brightness modes to be different, times for the source and/or drain of the driving transistor to be kept as bias adjustment signals can be different, so as to specifically adjust the bias situation of the driving transistor in each brightness mode, thereby ensuring display uniformity in each of the different brightness modes. Furthermore, by controlling at least one of the bias adjustment stages and the bias maintaining stages in different brightness modes to be different, to specifically adjust the bias situation of the driving transistor in each brightness mode, the bias adjustment signal provided by a driving chip is not required to be changed, so that an additional power consumption caused by repeated charging and discharging of a circuit, a signal line or the like due to a change of the bias adjustment signal can be reduced, and a display effect of the display panel is ensured on the premise that a display uniformity of the display panel is improved.

The preceding is the core idea of the present disclosure. Based on the embodiments of the present disclosure, all other embodiments obtained by the person of ordinary skill in the art without creative efforts are within the scope of the present disclosure. The technical solutions in the embodiments of the present disclosure are described clearly and completely hereinafter with reference to the drawings in the embodiments of the present disclosure.

Figure 2:
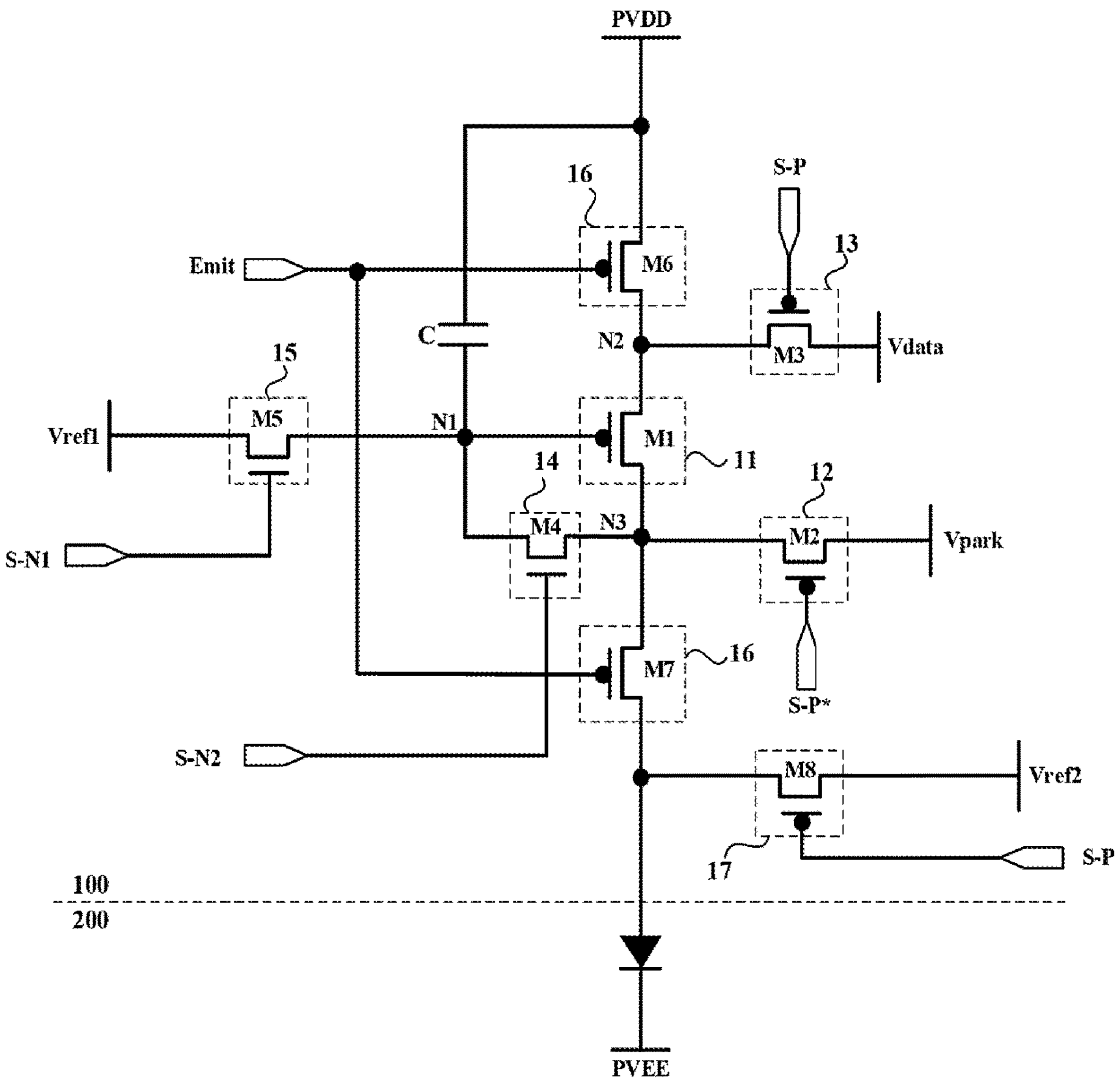
FIG. 2 is a schematic structural diagram of a pixel circuit in a display panel according to an embodiment of the present disclosure.

FIG. 1 is a schematic structural diagram of a display panel according to an embodiment of the present disclosure. FIG. 2 is a schematic structural diagram of a pixel circuit in a display panel according to an embodiment of the present disclosure. With reference to FIG. 1 and FIG. 2, a display panel 10 includes pixel circuits 100 and light-emitting elements 200. A pixel circuit 100 of the pixel circuits 100 includes a driving module 11 and a bias adjustment module 12. The driving module 11 is configured to provide a driving current for a light-emitting element 200 of the light-emitting elements 200 at a light emission stage, the driving module 11 includes a driving transistor M1, and the bias adjustment module 12 is configured to provide a bias adjustment signal for a source and/or drain of the driving transistor M1 in a bias adjustment stage. Time of one frame image of the display panel 10 includes at least one light emission stage and at least one non-light emission stage. At least a part of at least one non-light emission stage is a first non-light emission stage. The first non-light emission stage includes the bias adjustment stage. In the same first non-light emission stage, time between an end moment of the bias adjustment stage and an end moment of the first non-light emission stage is a bias maintaining stage. Operation modes of the display panel 10 include a first mode and a second mode; and a brightness of the display panel 10 in the first mode is different from a brightness of the display panel 10 in the second mode. At least one of a duration of the bias adjustment stage and a duration of the bias maintaining stage in the first mode is different from the corresponding one in the second mode.

The display panel 10 may include pixel circuits 100 arranged in an array and light-emitting elements 200 correspondingly electrically connected to the pixel circuits 100. Each pixel circuit 100 is provided with a data signal, so that a driving module 11 in a pixel circuit 100 can provide a driving current for a respective light-emitting element 200 in the light emission stage, so as to drive the light-emitting element 200 to display and emit light, thus, the display panel 10 can present a corresponding display image.

The light-emitting element 200 is typically a current driven element, and the data signal received by the pixel circuit 100 is typically a voltage signal, therefore, the driving transistor M1 is provided in the driving module 11, to allow the data signal received by the pixel circuit 100 to be written to a gate of the driving transistor M1, and in the light emission stage, a positive power supply signal PVDD is provided to a source or drain of the driving transistor M1, so that the driving transistor M1 generates, according to a voltage difference between its gate potential and the positive power supply signal and a threshold voltage of the driving transistor M1, a corresponding driving current and provides the corresponding driving current to the light-emitting element 200, to drive the light-emitting element 200 to emit light of a corresponding brightness. In this case, one electrode of the source and drain of the driving transistor M1 may be coupled to a positive power supply signal terminal, the other electrode of the source and drain of the driving transistor M1 may be coupled to an anode of the light-emitting element 200, and a cathode of the light-emitting element 200 may be electrically connected to a negative power supply signal terminal. In this way, in the light emission stage, a voltage difference is presented between the positive power supply signal PVDD at the positive power supply signal terminal and a negative power supply signal PVEE at the negative power supply signal terminal, therefore, a current passage is formed, thereby enabling the driving transistor M1 to generate the driving current, and provide the driving current to the light-emitting element 200, to drive the light-emitting element 200 to emit light.

It may be appreciated that an active layer material of the driving transistor M1 in the driving module 11 may include a low-temperature polycrystalline silicon material, so that the driving transistor M1 has a relatively high carrier mobility, thereby meeting the requirements such as a high reaction speed and a low power consumption, and in this case, the driving transistor M1 may be a PMOS-type transistor. In other optional embodiments, an active layer material of the driving transistor M1 may alternatively include an oxide semiconductor material, and in this case, the driving transistor M1 may be an NMOS-type transistor. On the premise that a core inventive point of an embodiment of the present disclosure can be implemented, the embodiments of the present disclosure impose no specific limitation on the material and type of the driving transistor M1.

It is to be noted that the source and drain of the transistor are not constant, but change with a state change of the transistor. FIG. 2 only illustratively shows a case where the driving transistor M1 is a PMOS-type transistor, and in this case, the drain of the driving transistor M1 is coupled to the light-emitting element 200, and for the driving transistor M1 of a PMOS type, the driving current I generated by the driving transistor M1 is positively related to $k(PVDD-Vdata)^2$, and the positive power supply signal PVDD is generally a fixed value. In a case where the PVDD is constantly greater than the Vdata, when the Vdata is smaller, the driving current I is larger, and the brightness of display and light emission of the light-emitting element 200 is greater.

Figure 3:
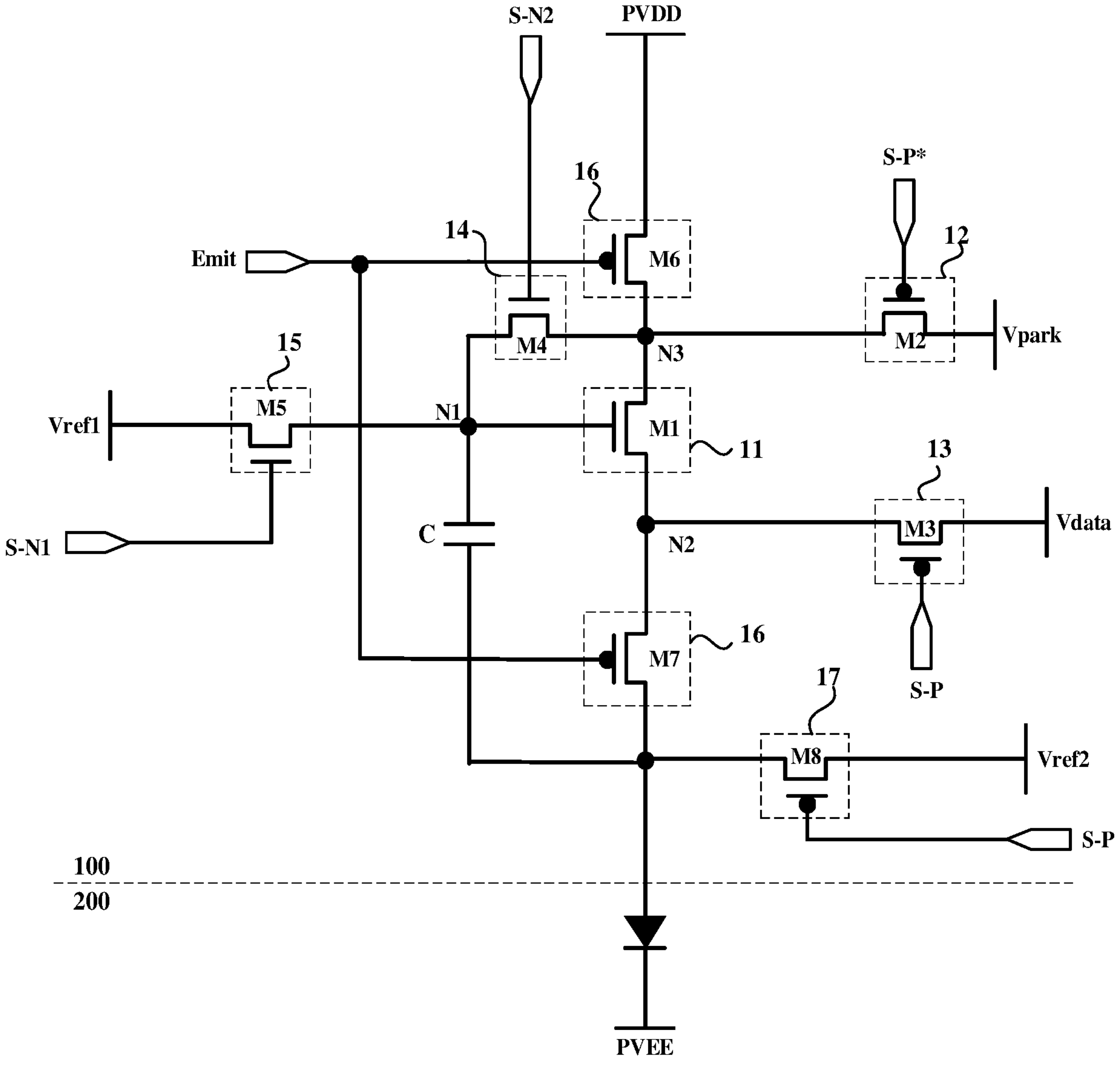
FIG. 3 is a schematic structural diagram of a pixel circuit in another display panel according to an embodiment of the present disclosure.

In other optional embodiments, FIG. 3 is a schematic structural diagram of a pixel circuit in another display panel according to an embodiment of the present disclosure. As shown in FIG. 3, when the driving transistor M1 is an NMOS-type transistor, the source of driving transistor M1 is coupled to the light-emitting element 200. For an NMOS-type driving transistor M1, in a case where the PVDD is constantly less than the Vdata, when the Vdata is larger, the driving current I is larger, and the brightness of display and light emission of the light-emitting element 200 is greater.

For ease of description, on the premise that no special limitation is imposed, each of the embodiments of the present disclosure takes the driving transistor being of a PMOS-type transistor as an example to illustratively describe the technical solution of the embodiment of the present disclosure.

With further reference to FIG. 1 and FIG. 2, when there is a deviation between the voltage of the gate of the driving transistor M1 and the voltage of the source and/or drain of the driving transistor M1, the driving transistor M1 may be located in the bias situation, for example, in the light emission stage, the voltage of the source or drain of the driving transistor M1 is the positive power supply signal PVDD, and the gate voltage of the driving transistor M1 includes a data signal, so that in the light emission stage, the voltage difference between the gate of the driving transistor M1 and the source or drain of the driving transistor M1 is maintained to be consistent with the voltage difference between the data signal and the positive power supply signal. While a fixed voltage difference is maintained between the gate of the driving transistor M1 and the source and/or drain of the driving transistor M1 for a long time, internal characteristics of the driving transistor M1 may change, so that a shift occurs in the threshold voltage of the driving transistor M1, therefore, the magnitude of the driving current provided by the driving transistor M1 to the light-emitting element 200 in the light emission stage is adversely affected, and further the brightness of light emission of the light-emitting element 200 is adversely affected.

The bias adjustment module 12 in the pixel circuit 100 can provide the bias adjustment signal for the source and/or drain of the driving transistor M1 at the bias adjustment stage of the first non-light emission stage, to allow the voltage of the source and/or drain of the driving transistor M1 to be maintained consistent with the bias adjustment signal, so that the voltage difference between the gate of the driving transistor M1 and the source and/or drain of the driving transistor M1 is changed to be consistent with the difference between the data signal and the bias adjustment signal, so as to adjust the bias situation of the driving transistor M1, to improve or eliminate the phenomenon of threshold voltage shift of the driving transistor M1 caused by a fixed voltage difference between the gate of the driving transistor M1 and the source and/or drain of the driving transistor M1 being maintained for a long term, thereby improving the display uniformity of the display panel 10, and ensuring the display effect of the display panel 10.

It may be appreciated that the bias adjustment module 12 provides the bias adjustment signal for the source and/or drain of the driving transistor M1 in the bias adjustment stage, that is, the bias adjustment module 12 provides the bias adjustment signal for only the source of the driving transistor M1 in the bias adjustment stage, and in this case, the bias adjustment module 12 may be electrically connected to the source of the driving transistor M1; or, the bias adjustment module 12 provides the bias adjustment signal for only the drain of the driving transistor M1 in the bias adjustment stage, and in this case, the bias adjustment module 12 may be electrically connected to the drain of the driving transistor M1; or, the bias adjustment module 12 provides the bias adjustment signal for both the source and the drain of the driving transistor M1 in the bias adjustment stage, and in this case, the bias adjustment module 12 may be electrically connected to the source and the drain of the driving transistor M1; or, when the bias adjustment module 12 provides the bias adjustment signal for both the source and the drain of the driving transistor M1 at the bias adjustment stage, the bias adjustment module 12 may also be electrically connected to only one of the source and the drain of the driving transistor M1, and in this case, the bias adjustment module 12, after providing the bias adjustment signal to one of the source and the drain of the driving transistor M1, can control the driving transistor M1 to be in the on state, so that the bias adjustment signal is transmitted from one of the source and the drain of the driving transistor M1 to the other.

For ease of description, the technical solution of embodiments of the present disclosure is illustratively described by taking it as an example that the bias adjustment module is electrically connected to one of the source and drain of the driving transistor M1, for example, as shown in FIG. 2 and FIG. 3, the bias adjustment module 12 is electrically connected to the drain of the driving transistor M1, and can provide the bias adjustment signal to both the source and drain of the driving transistor M1 in the bias adjustment stage.

In an optional embodiment, the bias adjustment module 12 is turned on or off under the control of a bias adjustment control signal S-P*, and when the bias adjustment control signal S-P* controls the bias adjustment module 12 to be turned on, the bias adjustment module 12 can provide a bias adjustment signal Vpark to the source and drain of the driving transistor M1. In this case, the bias adjustment module 12 may include a bias adjustment transistor M2, a gate of the bias adjustment transistor M2 receives the bias adjustment control signal S-P*, a first electrode of the bias adjustment transistor M2 receives the bias adjustment signal Vpark, and a second electrode of the bias adjustment transistor M2 is electrically connected to the drain of the driving transistor M1 at a node N3. The bias adjustment control signal S-P* is generally a pulse signal, and a transistor can be controlled to be turned on or off by a high level or low level of a pulse signal. In an embodiment of the present disclosure, the bias adjustment transistor M2 may be an NMOS-type transistor or a PMOS-type transistor. In a case where the bias adjustment transistor M2 is an NMOS-type transistor, and when the bias adjustment control signal S-P* is a high level, the bias adjustment transistor M2 is turned on, and when the bias adjustment control signal S-P* is a low level, the bias adjustment transistor M2 is turned off. In contrast, in a case where the bias adjustment transistor M2 is a PMOS-type transistor, and when the bias adjustment control signal S-P* is a low level, the bias adjustment transistor M2 is turned on, and when the bias adjustment control signal S-P* is a high level, the bias adjustment transistor M2 is turned off. Embodiments of the present disclosure impose no specific limitations on the type of the bias adjustment transistor M2.

The bias adjustment control signal S-P* may control the bias adjustment module 12 to be turned on in the bias adjustment stage, to allow the voltage difference between the gate of the driving transistor M1 and the source and drain of the driving transistor M1 to be maintained consistent with the voltage difference between the data signal Vdata and the bias adjustment signal Vpark. In other stages other than the bias adjustment stage, the bias adjustment control signal S-P* controls the bias adjustment module 12 to be turned off, so that the bias adjustment module 12 stops providing the bias adjustment signal Vpark to the source and drain of the driving transistor M1. In this case, if no other signals are written into the source and drain of the driving transistor M1, the source and drain of the driving transistor M1 are continuously maintained as the bias adjustment signal Vpark. For example, in the bias maintaining stage between the end moment of the bias adjustment stage and the end moment of the first non-light emission stage to which the bias adjustment stage belongs, the voltage difference between the gate of the driving transistor M1 and the source and drain of the driving transistor M1 may be continuously maintained consistent with the voltage difference between the data signal Vdata and the bias adjustment signal Vpark.

Figure 4:
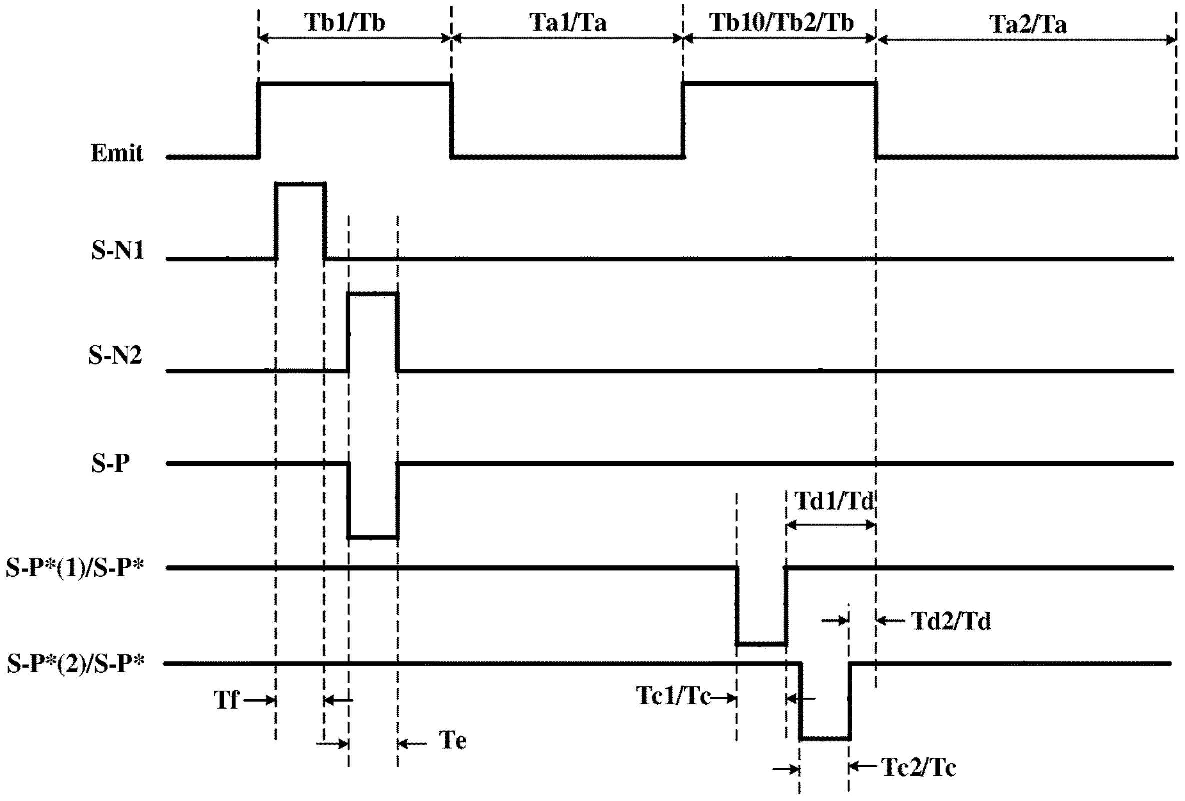
FIG. 4 is a driving timing diagram of a pixel circuit in a display panel according to an embodiment of the present disclosure.

For example, it is taken as an example that both the driving transistor M1 and the bias adjustment transistor M2 are PMOS-type transistor. FIG. 4 is a driving timing diagram of a pixel circuit in a display panel according to an embodiment of the present disclosure. With reference to FIG. 2 and FIG. 4, after a previous frame image ends, it may enter a first non-light emission stage Tb1 of a next frame image. In the first non-light emission stage Tb1 of a frame image, the data signal of a previous frame image written into the gate of the driving transistor M1 may be cleared, and a data signal of a current frame image is provided to the gate of the driving transistor M1. After the first non-light emission stage Tb1 ends, it may enter a first light emission stage Ta1. In the first light emission stage Ta1, the positive power supply signal PVDD may be provided to the source or drain of the driving transistor M1, to allow a voltage difference between the gate of the driving transistor M1 and the source of the driving transistor M1 to be less than a threshold voltage of the driving transistor M1, so that the driving transistor M1 generates a driving current, and provides the driving current to the light-emitting element 200, to drive the light-emitting element 200 to emit light. After the first light emission stage Ta1 ends, it may enter a second non-light emission stage Tb2. In the second non-light emission stage Tb2, the gate voltage of the driving transistor M1 may remain unchanged. In this case, a bias adjustment signal may be provided to the source and/or drain of the driving transistor M1 to alleviate or offset a case in which a threshold voltage of the driving transistor M1 shifts since a voltage difference is presented between the gate of the driving transistor and the source and/or drain of the driving transistor in the last light emission stage Ta1, thereby, after entering the next light emission stage Ta2, the driving transistor M1 can be restored to the state before the first light-emission stage Ta1 as much as possible, to ensure that the driving transistor M1 can emit light accurately in the next light emission stage Ta2. By analogy, when the time of one frame image includes more non-light emission stages Tb and light emission stages Ta, the non-light emission stages Tb and the light emission stages Ta are performed alternately until it enters a next frame image.

It is to be noted that, FIG. 4 simply exemplarily shows that the time of one frame image includes two non-light emission stages Tb and two light emission stages Ta, however, in an embodiment of the present disclosure, it is generally set, according to a multiple relationship between a refresh rate of a current frame image and a basic refresh rate of a display panel, a corresponding number of non-light emission stages Tb and a corresponding number of light emission stages Ta. For example, when a basic refresh rate of a display panel is 120 Hz, if a refresh rate of a current frame display image is 120 Hz, the current frame display image may include J non-light emission stages Tb and J light emission stages Ta; or, when the refresh rate of the current frame display image is 60 Hz, the current frame display image may include 2 J non-light emission stages Tb and 2 J light emission stages Ta; or, when the refresh rate of the current frame display image is 30 Hz, the current frame display image may include 4 J non-light emission stages Tb and 4 J light emission stages Ta, and by analogy, it may determine the number of non-light emission stages Tb and the number of light emission stages Ta included in the time of one frame image of the display panel 10 in different refresh rate. In an embodiment of the present disclosure, the basic refresh rate of the display panel 10 and the refresh rate of a current frame image are not specifically limited. J may be equal to any positive integer. For ease of description, in an embodiment of the present disclosure, it is used as an example for illustration that J is equal to 1.

For example, if a current display frequency of the display panel is ½ of a basic frequency, time of each frame display image may include two non-light emission stages Tb and two light emission stages Ta. In this case, a second non-light emission stage Tb2 may be a first non-light emission stage Tb10, and the first non-light emission stage Tb10 may include a bias adjustment stage Tc. In the bias adjustment stage Tc, the bias adjustment control signal S-P* is a low level that controls the bias adjustment transistor M2 in the bias adjustment module 12 to be turned on. In this case, the bias adjustment signal Vpark of the bias adjustment signal terminal can be transmitted to the drain of the driving transistor M1 through the turned-on bias adjustment transistor M2, and is transmitted from the drain of the driving transistor M1 to the source of the driving transistor M1, so that both the source and the drain of the driving transistor M1 are the bias adjustment signal. After the bias adjustment stage Tc ends, it may enter a bias maintaining stage Td, and in the bias maintaining stage Td, the gate, source and drain of the driving transistor M1 are maintained consistent with the signal written in the bias adjustment stage Tc.

It may be appreciated that, in different application scenarios, the display panel 10 may operate in different operation modes, and in the different operation modes, the display panel 10 may present different display brightnesses. For example, in an environment with a high brightness, to enable the image presented by the display panel 10 to be identified by a human eye, the image displayed by the display panel 10 is generally controlled to have a high display brightness. In a dark environment, to prevent damage to the human eyes caused by a relatively high display brightness of an image presented by the display panel 10, the image displayed by the display panel 10 may be generally controlled to have a relatively low display brightness. The ratio of the light emission stage Ta to the non-light emission stage Tb of the light-emitting element 200 in one frame image is adjusted, thereby enabling the display panel 10 to have different display brightness in different operation modes; or, the relationship between the grayscale (that is, the brightness level of light emission of the light-emitting element) and the data signal is adjusted, thereby also enabling the display panel 10 to have different display brightnesses in different operation modes.

When the operation modes of the display panel 10 include a first mode and a second mode and the brightness of the display panel 10 in the first mode is different from the brightness of the display panel 10 in the second mode, and when the display panel 10 presents the same image in the first mode and the second mode separately, data signals received by the gate of the driving transistor in each pixel circuit 100 are different, or the durations for the voltage difference between the gate and the source and/or drain of the driving transistor M1 in each pixel circuit 100 to be maintained as the difference between the data signal and the positive power supply signal PVDD are different, so that the bias situation of the driving transistor M1 in each pixel circuit 100 in the first mode is different from that in the second mode.

For example, it is taken as an example that a relationship between grayscale (that is, brightness level of light emission of the light-emitting element) and the data signal is adjusted to allow the display panel 10 to have different display brightnesses in different operation modes. When the brightness of the display panel 10 in the first mode is less than the brightness of the display panel 10 in the second mode, in the first mode, when the brightness level (that is, grayscale) presented by the light-emitting element 200 is n, a data signal required to be provided to the driving transistor M1 in the pixel circuit 100 is Vdata1; however, in the second mode, when the brightness level presented by the light-emitting element 200 is also n, a data signal required to be provided to the driving transistor M1 in the pixel circuit 100 is Vdata2. If the driving transistor M1 is a PMOS-type transistor, the Vdata1 may be greater than the Vdata2. In this way, when in the first mode and the second mode, signals received by the source of the driving transistor M1 are both the positive power supply signal PVDD, the voltage difference between the gate and the source of the driving transistor M1 in the first mode may be less than the voltage difference between the gate and the source of the driving transistor M1 in the second mode, so that the bias situations of the driving transistor M1 in the first mode and the second mode may be different, and in this case, bias adjustment is required to be performed on the driving transistor M1 differently for different operation modes of the display panel 10.

In an exemplary embodiment, with further reference to FIG. 1, FIG. 2, and FIG. 4, in the first mode, a bias adjustment control signal S-P*(1) provided to the bias adjustment transistor M2, in a bias adjustment stage Tc1 of the first non-light emission stage Tb10 of the first mode, is an enable level that can control the bias adjustment transistor M2 to be turned on, to provide a bias adjustment signal Vpark1 to each of the source and drain of the driving transistor M1, and after the bias adjustment stage Tc1 of the first non-light emission stage Tb10 ends, it may enter a bias maintaining stage Td1 of the first non-light emission stage Tb10. In the second mode, a bias adjustment control signal S-P*(2) provided to the bias adjustment transistor M2, in a bias adjustment stage Tc2 of the first non-light emission stage Tb10 of the second mode, is an enable level that can control the bias adjustment transistor M2 to be turned on, to provide a bias adjustment signal Vpark2 to each of the source and drain of the driving transistor M1, and after the bias adjustment stage Tc2 of the first non-light emission stage Tb10 ends, it may enter a bias maintaining stage Td2 of the first non-light emission stage Tb10. The bias maintaining stage Td1 in the first mode is set to be greater than the bias maintaining stage Td2 in the second mode, thereby, the duration for the voltage difference between the gate and the source and drain of the driving transistor M1 to be maintained consistent with the Vdata1-Vpark1 in the first mode can be greater than the duration for the voltage difference between the gate and the source and drain of the driving transistor M1 to be maintained consistent with the Vdata2-Vpark2 in the second mode, so that at the end moment of the first non-light emission stage Tb10, the bias degree of the driving transistor M1 in the first mode can be maintained consistent with the bias degree of the driving transistor M1 in the second mode, to balance the different bias situations caused by different data signals in the two modes, to realize targeted adjustment for the bias situations of the driving transistor M1 in different operation modes, thereby facilitating the uniformity of display of the display panel 10 in different operation modes.

Figure 5:
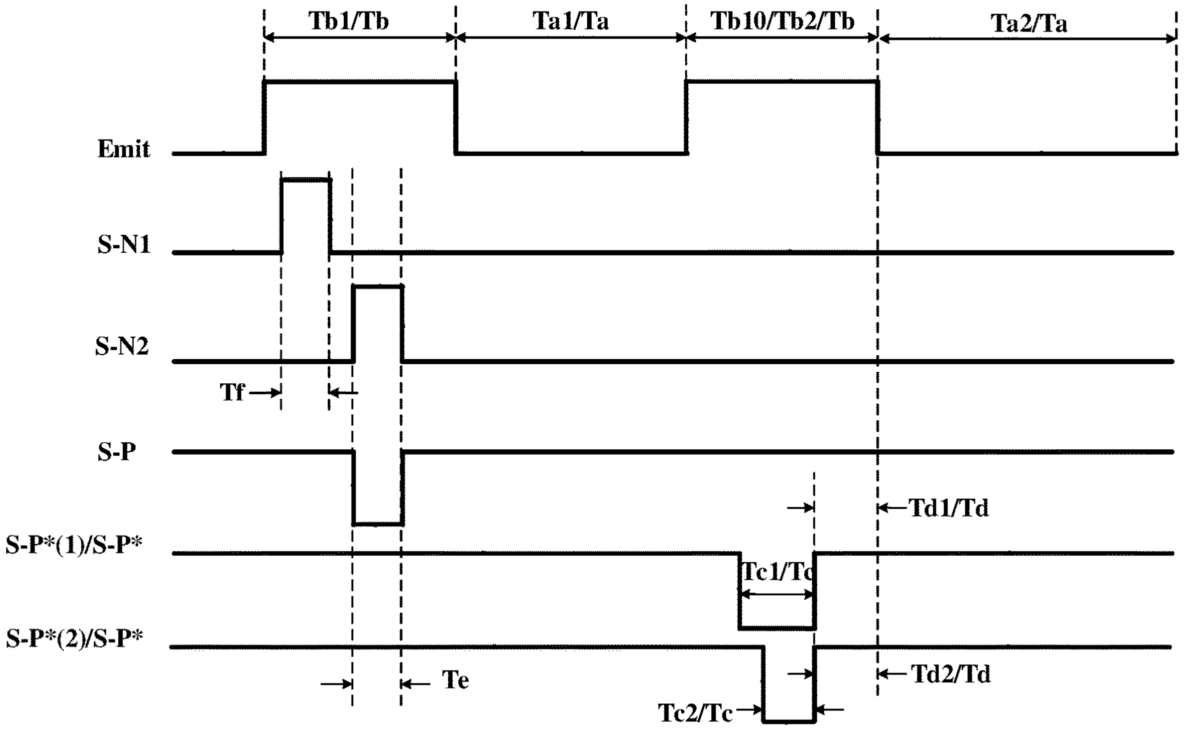
FIG. 5 is a driving timing diagram of a pixel circuit in another display panel according to an embodiment of the present disclosure.

In another exemplary embodiment, FIG. 5 is a driving timing diagram of a pixel circuit in another display panel according to an embodiment of the present disclosure. For similarities between FIG. 5 and FIG. 4, reference may be made to the foregoing description for FIG. 4, which are not described herein again. With reference to FIG. 1, FIG. 2, and FIG. 5, the bias adjustment control signal S-P*(1) provided to the bias adjustment module 12 in the first mode is maintained as an enable level in the bias adjustment stage Tc1 of the first non-light emission stage Tb10; and the bias adjustment control signal S-P*(2) provided to the bias adjustment module 12 in the second mode is maintained as an enable level in the bias adjustment stage Tc2 of the first non-light emission stage Tb10. In this case, the duration of the bias adjustment stage Tc1 in the first mode is set to be different from the duration of the bias adjustment stage Tc2 in the second mode, thereby, the duration for writing the bias adjustment signal Vpark1 to the source and drain of the driving transistor M1 in the first mode is different from the duration for writing the bias adjustment signal Vpark2 to the source and drain of the driving transistor M1 in the second mode, so that at the end moment of the bias adjustment stage Tc, the bias degree of the driving transistor M1 in the first mode can be maintained consistent with the bias degree of the driving transistor M1 in the second mode, thereby, targetedly adjusting the bias situations of the driving transistor M1 in different operation modes, and further facilitating the uniformity of display of the display panel 10 in different operation modes.

Figure 6:
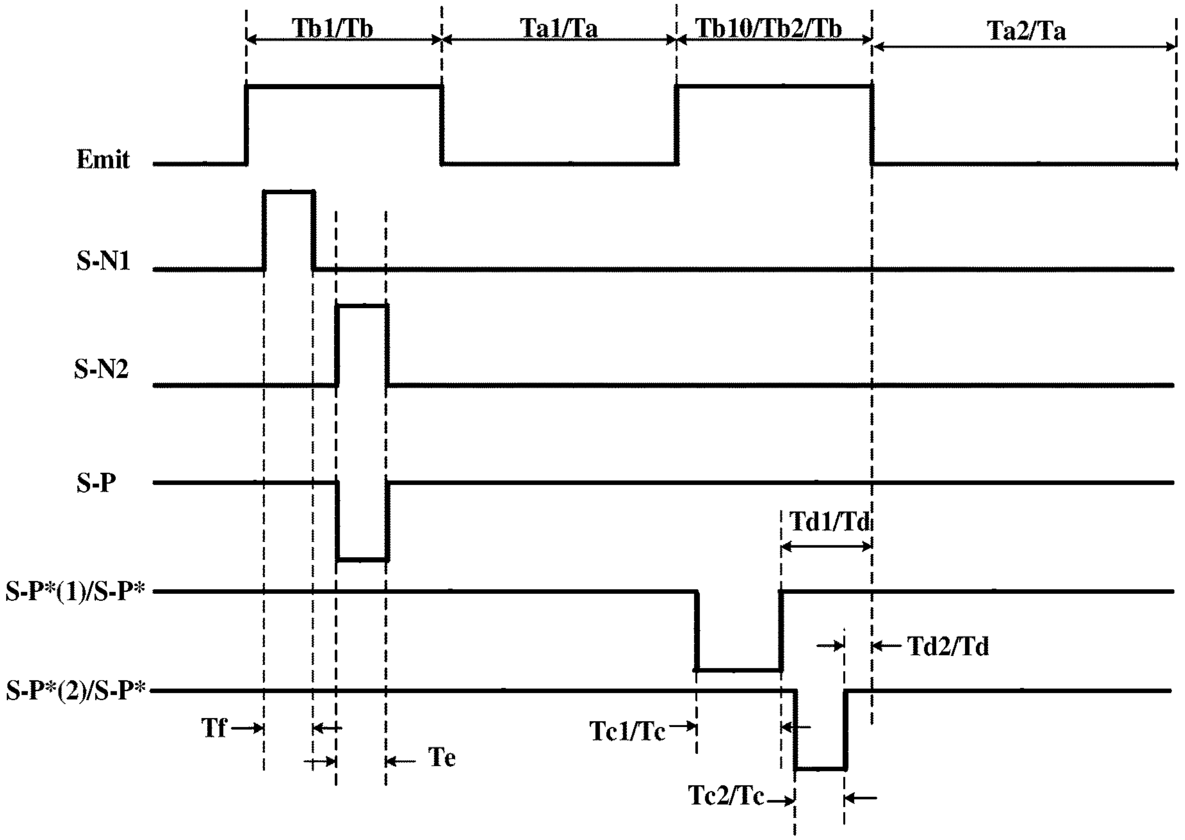
FIG. 6 is a driving timing diagram of a pixel circuit in yet another display panel according to an embodiment of the present disclosure.

In still another exemplary embodiment, FIG. 6 is a driving timing diagram of a pixel circuit in still another display panel according to an embodiment of the present disclosure. With reference to FIG. 1, FIG. 2, and FIG. 6, the duration of the bias adjustment stage Tc1 in the first mode is different from the duration of the bias adjustment stage Tc2 in the second mode. In addition, the duration of the bias maintaining stage Td1 in the first mode is different from the duration of the bias maintaining stage Td2 in the second mode. In this case, targeted adjustment for the bias situations of the driving transistor M1 in different operation modes can also be realized, thereby improving the uniformity of display of the display panel 10 in different operation modes.

In an optional embodiment, the voltage of the bias adjustment signal Vpark1 in the first mode may be the same as the voltage of the bias adjustment signal Vpark2 in the second mode. In this way, it is controlled to allow at least one of the bias adjustment stages Tc and the bias maintaining stages Td in different operation modes to be different, so that on the premise that targeted adjustments are performed on the bias situations of the driving transistor M1 in various lightness modes, the bias adjustment signal Vpark provided by a driving chip is not required to be changed, thereby, an additional power consumption caused by repeated charging and discharging of a circuit, a signal line, or the like due to a change of the bias adjustment signal can be reduced, and further the display effect of the display panel 10 is ensured on the premise that a display uniformity of the display panel 10 is improved.

It is to be noted that, the operation modes of the display panel mentioned in the embodiments of the present disclosure include a first mode and a second mode, however the first mode and the second mode do not simply refer to two operation modes of the display panel 10, but are used to represent various operation modes of the display panel 10, and in different operation modes, the display panel 10 will display with different brightnesses. In embodiments of the present disclosure, in different application scenarios, the display panel 10 operates in different operation modes so that the display panel 10 displays with different brightnesses. In the embodiments of the present disclosure, for ease of description, unless otherwise stated, the operation modes of the display panel 10 including two modes (the first mode and the second mode) may be taken as an example, to illustrate the technical solutions of the embodiments of the present disclosure.

In the technical solution of the embodiments of the present disclosure, the first non-light emission stage of the non-light emission stage includes the bias adjustment stage and the bias maintaining stage, and in the bias adjustment stage and the bias maintaining stage, it is ensured that the voltage difference between the source and/or drain of the driving transistor and the gate of the driving transistor is just the voltage difference between the bias adjustment signal and the gate of the driving transistor, to be distinguished from the voltage difference between the source and/or drain of the driving transistor and the gate of the driving transistor in the light emission stage, so as to implement bias adjustment to the driving transistor in the bias adjustment stage and the bias maintaining stage, and improve the situation that since the voltage difference between the source and/or drain of the driving transistor and the gate of the driving transistor keeps constant for a long term, the ions inside the driving transistor are polarized and threshold voltage shift occurs. In addition, when the display panel is in different modes, the display panel presents different display brightnesses, and when the display panel presents different display brightnesses, the gate voltages of the driving transistor are different. In this case, by controlling at least one of the bias adjustment stages and the bias maintaining stages in different brightness modes to be different, durations for the source and/or drain of the driving transistor to be kept as bias adjustment signals can be set different, so as to targetedly adjust bias situations of the driving transistor in the brightness modes, thereby ensuring display uniformity in different brightness modes. Furthermore, by controlling at least one of the bias adjustment stages and the bias maintaining stages in different brightness modes to be different, to targetedly adjust bias situations of the driving transistor in the brightness modes, the bias adjustment signal provided by the driving chip is not required to be changed, so that the additional power consumption caused by repeated charging and discharging of a circuit, a signal line, or the like due to a change of the bias adjustment signal can be reduced, and the display effect of the display panel is ensured on the premise that the display uniformity of the display panel is improved.

It may be appreciated that at least one of the bias adjustment stages Tc and the bias maintaining stages Td in the first mode and the second mode is different. The method of setting at least one of the bias adjustment stages Tc and the bias maintaining stages Td in different operation modes to be different may be implemented by adjusting the start moments and the end moments of the bias adjustment control signal Vpark provided to the bias adjustment module 12.

Figure 7:
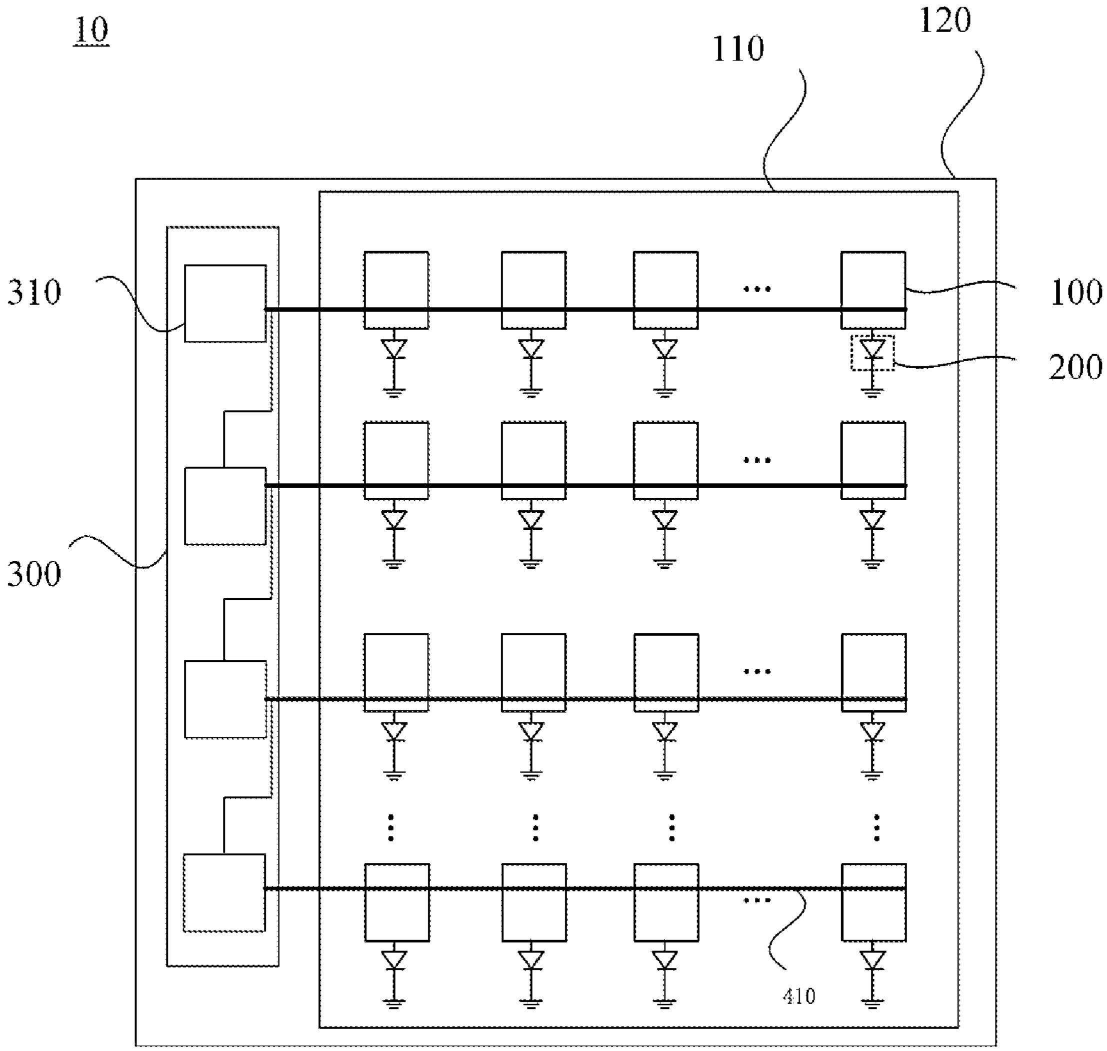
FIG. 7 is a schematic structural diagram of another display panel according to an embodiment of the present disclosure viewed from the top.

In an optional embodiment, FIG. 7 is a schematic structural diagram of another display panel according to an embodiment of the present disclosure viewed from the top. With reference to FIG. 2, FIG. 4 to FIG. 6, and FIG. 7, the display panel 10 may include a display region 110 and a non-display region 120, multiple pixel circuits 100 arranged in an array and multiple light-emitting elements 200 correspondingly electrically connected to the multiple pixel circuits 100 are provided in the display region 110, and at least one shift register circuit 300 is provided in the non-display region 120. The shift register circuit 300 may include cascaded multiple shift register units 310. In one frame image, signals provided by the shift register units 310 of the shift register circuit 300 can perform scanning on the pixel circuits 100 line by line, so that the pixel circuits 100 can perform operation sequentially.

The shift register circuit 300 includes at least a shift register circuit 300 that provides a bias adjustment control signal. In this case, multiple control signal lines 410 are further provided in the display region 110, and gates of the bias adjustment transistors M2 of at least a part of the pixel circuits 100 located in the same line are electrically connected to the same control signal line 410. Signal output terminals of the shift register units 310 of the shift register circuit 300 are electrically connected to the control signal lines 410 respectively, so as to provide enable levels of the bias adjustment control signals S-P* to the control signal lines 410 sequentially. A start moment and an end moment of each of the bias adjustment control signals S-P* that are provided by the shift register units 310 of the shift register circuit 300 to the control signal lines 410 are determined by the control signal received by the respective shift register unit 310. Therefore, simply adjusting the control signals provided to the shift register units 310 may just realize adjustment to the durations of the bias adjustment stages Tc and the durations of the bias maintaining stages Td in different operation modes.

Optionally, with further reference to FIG. 2 and FIG. 4 (or any drawing in FIG. 5 and FIG. 6), the pixel circuit 100 further includes a data writing module 13 configured to provide a data signal Vdata to the gate of the driving transistor M1 in a data writing stage, and the non-light emission stage Tb of the time of one frame image of the display panel 10 includes a data writing stage Te. In the same pixel circuit 100, the time for the data writing stage Te and the time for the bias adjustment stage Tc do not overlap.

Specifically, when the data signals Vdata received by the driving transistor M1 are different, the driving currents generated by the driving transistor M1 are different, so that the light-emitting element 200 has different light emission brightnesses. Generally, the first non-light emission stage Tb1 of a frame image includes the data writing stage Te. In each data writing stage Te, the data writing module 13 may be controlled to provide a corresponding data signal Vdata to the gate of the driving transistor M1, so that when it enters the light emission stage Ta of the frame image, the driving transistor M1 can provide, according to the data signal Vdata of its gate, a corresponding driving current to the light-emitting element 20, so as to control the light emission brightness of the light-emitting element 200, so that the display panel 10 presents the display image with corresponding content and brightness.

Time for the data writing stage Te and time for the bias adjustment stage Tc of the same pixel circuit 100 do not overlap, that is, while the data signal Vdata is being written, the bias adjustment signal Vpark may not be provided to any one of the source and drain of the driving transistor M1, so as to prevent the bias adjustment signal Vpark from adversely affecting accuracy of the data signal Vdata writing, vise verse, while the bias adjustment signal Vpark is being provided to at least one of the source and drain of the driving transistor M1, the data signal Vdata is also not provided to the gate of the driving transistor M1. In this case, the bias adjustment stage Tc may be located before or after the data writing stage Te.

It is to be noted that, FIG. 4 to FIG. 6 simply exemplarily show that in the time of one frame image, the first non-light emission stage Tb1 includes the data writing stage Te, and the second non-light emission stage Tb2 (that is, the first non-light emission stage Tb10) includes the bias adjustment stage Tc, that is, the data writing stage Te and the bias adjustment stage Tc are respectively located in different non-light emission stages, and the data writing stage Te is before the bias adjustment stage Tc, however, it is not limited to this setting manner in embodiments of the present disclosure.

Figure 8:
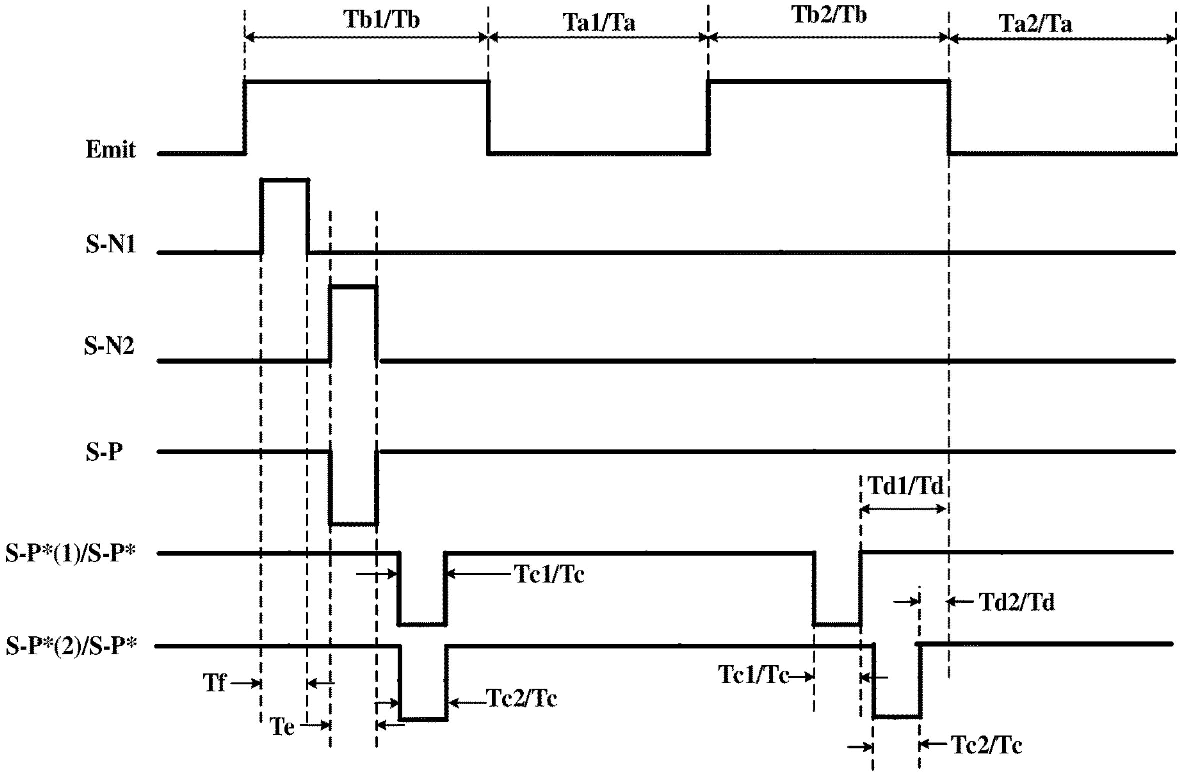
FIG. 8 is a driving timing diagram of a pixel circuit in yet another display panel according to an embodiment of the present disclosure.

In one exemplary embodiment, FIG. 8 is a driving timing diagram of a pixel circuit in yet another display panel 10 according to an embodiment of the present disclosure. With reference to FIG. 2 and FIG. 8, a first non-light emission stage Tb1 of one frame image includes both the data writing stage Te and the bias adjustment stage Tc, and the bias adjustment stage Tc is after the data writing stage Te, that is, after writing of the data signal Vdata to the gate of the driving transistor M1 is completed, it may enter the bias adjustment stage Tc, and in the bias adjustment stage Tc, the bias adjustment signal Vpark can be written to the source and drain of the driving transistor M1, so that before the light emission stage Ta, the potentials of the sources and drains of the driving transistors M1 of the pixel circuits 100 are maintained consistent, that is, bias situations of the driving transistors M1 are consistent, which facilitates the improvement of display uniformity of the display panel 10.

Figure 9:
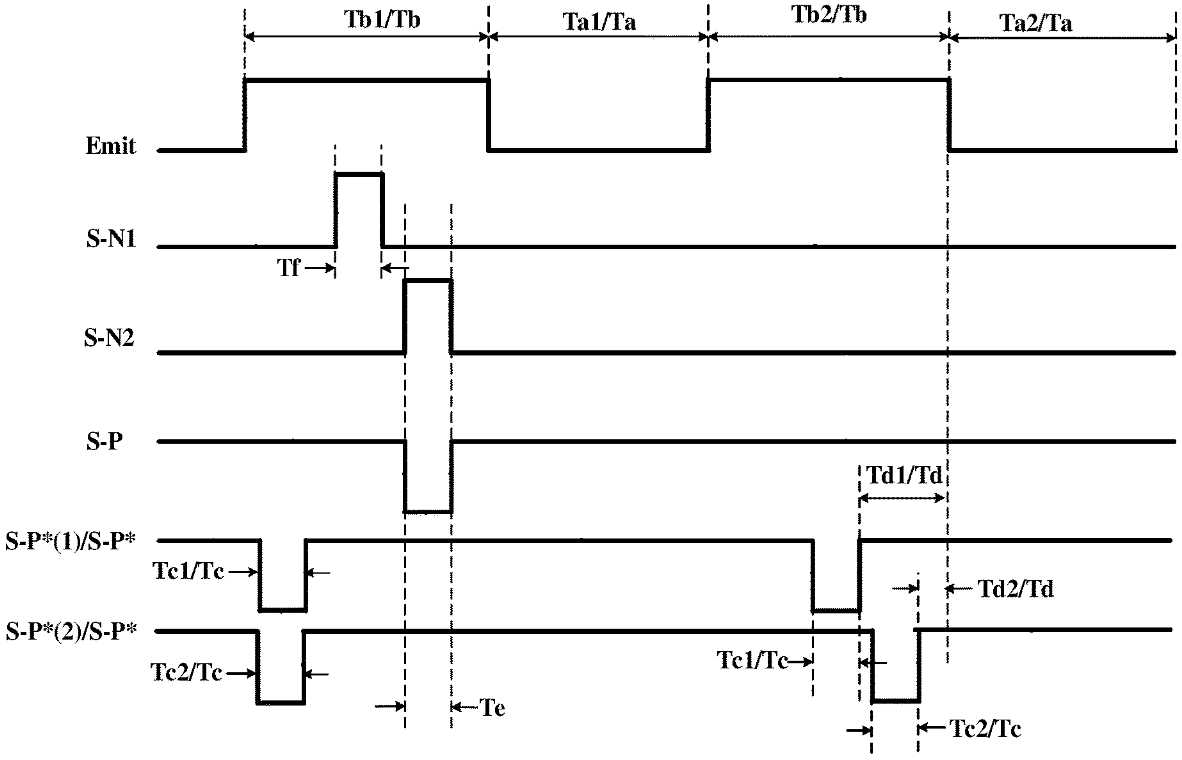
FIG. 9 is a driving timing diagram of a pixel circuit in yet another display panel according to an embodiment of the present disclosure.

In another exemplary embodiment, it is taken as an example that the bias maintaining stages in different operation modes are different, FIG. 9 is a driving timing diagram of a pixel circuit in yet another display panel according to an embodiment of the present disclosure, with reference to FIG. 2 and FIG. 9, a first non-light emission stage Tb1 of a frame image includes both a data writing stage Te and a bias adjustment stage Tc, and the bias adjustment stage Tc is before the data writing stage Te, that is, after the last frame image ends, due to a voltage difference presented between the gate of the driving transistor M1 and the source and drain of the driving transistor M1 in a light emission stage Ta of the last frame image, the driving transistor M1 is in a bias situation, which is not conductive to writing of the data signal Vdata of the current frame image, thus, the bias adjustment signal Vpark is provided to the source and drain of the driving transistor M1 in the bias adjustment stage Tc, to alleviate or eliminate the bias situation of the driving transistor M1 in the light emission stage of the last frame image, thereby, when it enters the data writing stage after the bias adjustment stage Tc, the data signal Vdata can be accurately written to the gate of driving transistor M1.

It may be appreciated that the data writing module 13 may be directly electrically connected to the gate of the driving transistor M1, so that it can directly provide the data signal to the gate of the driving transistor M1. The data writing module 13 may also be indirectly electrically connected to the gate of the driving transistor M1; which is not specifically limited in the embodiments of the present disclosure as long as the data writing module 13 can provide a data signal for the driving transistor M1.

Exemplarily, with further reference to FIG. 2 and FIG. 4 (or any one of FIG. 5 and FIG. 6 and FIG. 8 and FIG. 9), one terminal of the data writing module 13 may receive the data signal Vdata, another terminal of the data writing module 13 may be electrically connected to the source of the driving transistor M1 at a node N2, and the data writing module 13 may be turned on or off under the control of a scan signal S-P. When the scan signal S-P controls the data writing module 13 to be turned on, the data writing module 13 can write the data signal Vdata to the source of the driving transistor M1, and the date signal Vdata is transmitted from the source of the driving transistor M1 to the gate of the driving transistor M1. In this case, the data writing module 13 may include a data writing transistor M3. A gate of the data writing transistor M3 may receive the scan signal S-P, a first electrode of the data writing transistor M3 may receive a data signal Vdata, and a second electrode of the data writing transistor M3 may be electrically connected to the source of the driving transistor M1. The data writing transistor M3 may be an NMOS-type transistor or a PMOS-type transistor. In a case where the data writing transistor M3 is an NMOS-type transistor, when the scan signal S-P is a high level, the data writing transistor M3 is turned on, and when the scan signal S-P is a low level, the data writing transistor M3 is turned off. In contrast, in a case where the data writing transistor M3 is a PMOS-type transistor, when the scan signal S-P is a low level, the data writing transistor M3 is turned on, and when the scan signal S-P is a high level, the data writing transistor M3 is turned off. Embodiments of the present disclosure impose no specific limitation on the type of the data writing transistor M3.

Optionally, with further reference to FIG. 2 and FIG. 4 (or any drawing in FIG. 5 and FIG. 6 and FIG. 8 and FIG. 9), when the data writing module 13 is electrically connected to the source of the driving transistor M1, the pixel circuit 100 may further include a compensation module 14, the compensation module 14 is electrically connected between the drain and the gate of the driving transistor M1, that is, one terminal of the compensation module 14 is electrically connected to the drain of the driving transistor M1 at the node N3, and another terminal of the compensation module 14 is electrically connected to the gate of the driving transistor M1 at a node N1. The compensation module 14 can compensate the threshold voltage of the driving transistor M1 to the gate of the driving transistor M1 while the data signal Vdata is being written, to offset or mitigate the effect of the threshold voltage of the driving transistor M1 on the driving current provided by the driving transistor M1 in the light emission stage.

Exemplarily, the compensation module 14 can be turned on or off under the control of a scan signal S-N2, and when the scan signal S-N2 controls the compensation module 14 to be turned on, the compensation module 14 can adjust the voltage between the gate and the drain of the driving transistor M1, and compensate for the threshold voltage of the driving transistor M1. In this case, the compensation module 14 may include a compensation transistor M4. A first electrode of the compensation transistor M4 is electrically connected to the drain of the driving transistor M1, a second electrode of the compensation transistor M4 is electrically connected to the gate of the driving transistor M1, and a gate of the compensation transistor M4 receives the scan signal S-N2.

It may be appreciated that the compensation transistor M4 may be an NMOS-type transistor, and the material of an active layer of the compensation transistor M4 may include an oxide semiconductor, which may be specifically an indium gallium zinc oxide semiconductor (IGZO). In this case, the compensation transistor M4 is turned on under the control of a high level of the scan signal S-N2, and is turned off under the control of a low level of the scan signal S-N2.

In other optional embodiments, the compensation transistor M4 may also be a PMOS-type transistor, and the material of an active layer of the compensation transistor M4 may include a silicon based semiconductor, for example, a low-temperature polycrystalline silicon (LTPS) semiconductor. In this case, the compensation transistor M4 is turned on under the control of a low level of a scan signal received by the gate of the compensation transistor M4, and is turned off under the control of a high level of the scan signal received by the gate of the compensation transistor M4. Embodiments of the present disclosure impose no specific limitation on the type of the compensation transistor.

It may be appreciated that when the data writing module 13 is electrically connected to the source of the driving transistor M1, and the compensation module 14 is electrically connected between the drain and the gate of the driving transistor M1, the data signal Vdata is required to be written into the gate of the driving transistor M1 sequentially through the data writing module 13, the driving transistor M1, and the compensation module 14. Therefore, before the data writing stage, the driving transistor M1 is required to be in an on state, in this case, an initialization signal Vref1 may be provided to the gate of the driving transistor M1 before the data writing stage, to initialize the gate of the driving transistor M1, to allow the driving transistor M1 to be in the on state when the data writing stage starts.

Correspondingly, with further reference to FIG. 2 and FIG. 4 (or any drawing in FIG. 5 and FIG. 6 and FIG. 8 and FIG. 9), the pixel circuit 100 may further include an initialization module 15. One terminal of the initialization module 15 receives the initialization signal Vref1, and another terminal of the initialization module 15 is electrically connected to the gate of the driving transistor M1. In an initialization stage Tf, the initialization module 15 can transmit the initialization signal Vref1 to the gate of the driving transistor M1, so as to initialize the gate of the driving transistor M1.

The initialization module 15 may be turned on or off under the control of a scan signal S-N1, and when the scan signal S-N1 controls the initialization module 15 to be turned on, the initialization signal Vref1 is transmitted to the gate of the driving transistor M1. In this case, the initialization module 15 may include an initialization transistor M5. A gate of the initialization module 15 receives the scan signal S-N1, a first electrode of the initialization transistor M5 receives the initialization signal Vref1, and a second electrode of the initialization transistor M5 is electrically connected to the gate of the driving transistor M1 at the node N1.

It may be appreciated that the initialized transistor M5 may be an NMOS-type transistor, and the material of an active layer of the initialized transistor M5 may include an oxide semiconductor, which may be specifically an indium gallium zinc oxide semiconductor (IGZO). In this case, the initialized transistor M5 is turned on under the control of a high level of the scan signal S-N1, and is turned off under the control of a low level of the scan signal S-N1.

In other optional embodiments, the initialized transistor M5 may also be a PMOS-type transistor, and the material of an active layer of the initialized transistor M5 may include a silicon based semiconductor, for example, a low-temperature polycrystalline silicon (LTPS) semiconductor. In this case, the initialized transistor M5 is turned on under the control of a low level of a scan signal received by the gate of the initialized transistor M5, and is turned off under the control of a high level of the scan signal received by the gate of the initialized transistor M5. Embodiments of the present disclosure impose no specific limitation on the type of the initialized transistor M5.

Figure 10:
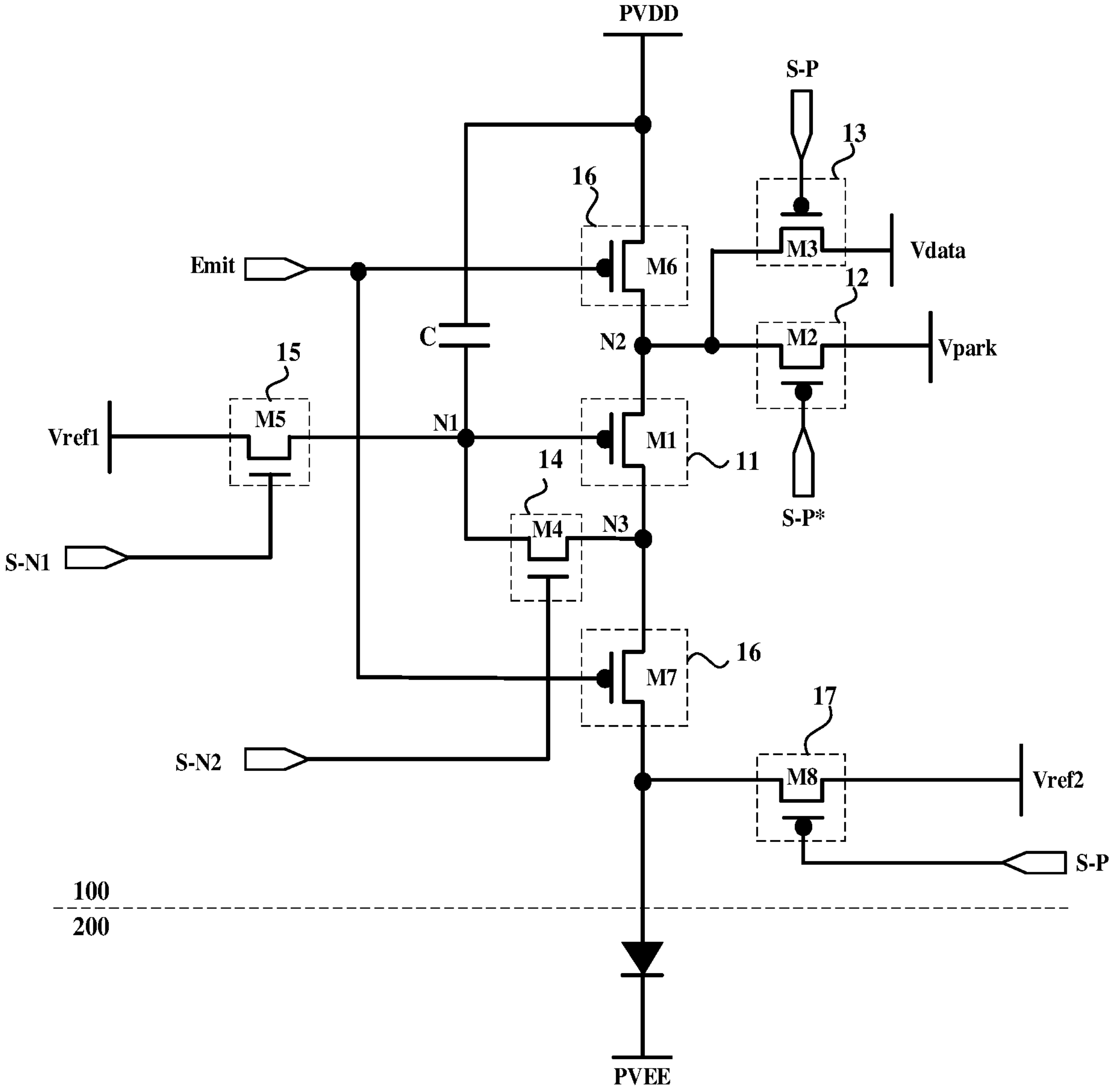
FIG. 10 is a schematic structural diagram of a pixel circuit in another display panel according to an embodiment of the present disclosure.
Figure 11:
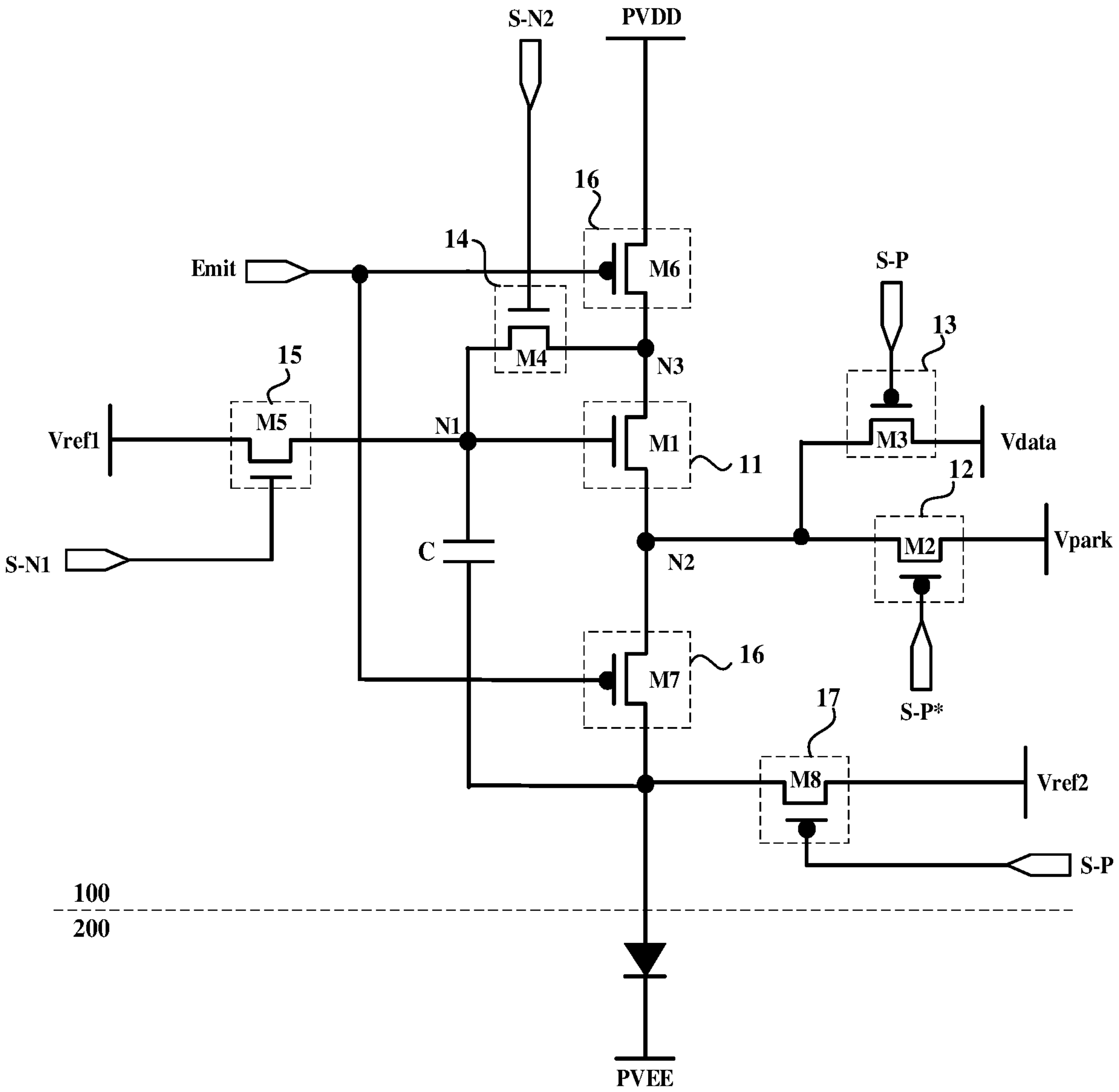
FIG. 11 is a schematic structural diagram of a pixel circuit in another display panel according to an embodiment of the present disclosure.

It may be appreciated that, the above simply exemplify the technical solution of the embodiment of the present disclosure by taking it as an example that the data writing module 13 and the bias adjustment module 12 are electrically connected to the source and the drain of the driving transistor M1 respectively. In other embodiments of the present disclosure, FIG. 10 is a schematic structural diagram of a pixel circuit in another display panel according to an embodiment of the present disclosure, FIG. 11 is a schematic structural diagram of a pixel circuit in another display panel according to an embodiment of the present disclosure, as shown in any of FIG. 10 and FIG. 11, the data writing module 13 and the bias adjustment module 12 may both be electrically connected to the source of the driving transistor M1, the operation principle of this configuration is similar to the situation where the data writing module 13 and the bias adjustment module 12 are electrically connected to the source and the drain of the driving transistor M1, respectively, and is not repeatedly described here.

It is to be noted that the above only exemplify by taking it as an example that the same non-light emission stage includes only one bias adjustment stage, while in other embodiments of the present disclosure, the non-light emission stage may also include two bias adjustment stages or multiple bias adjustment stages.

Figure 12:
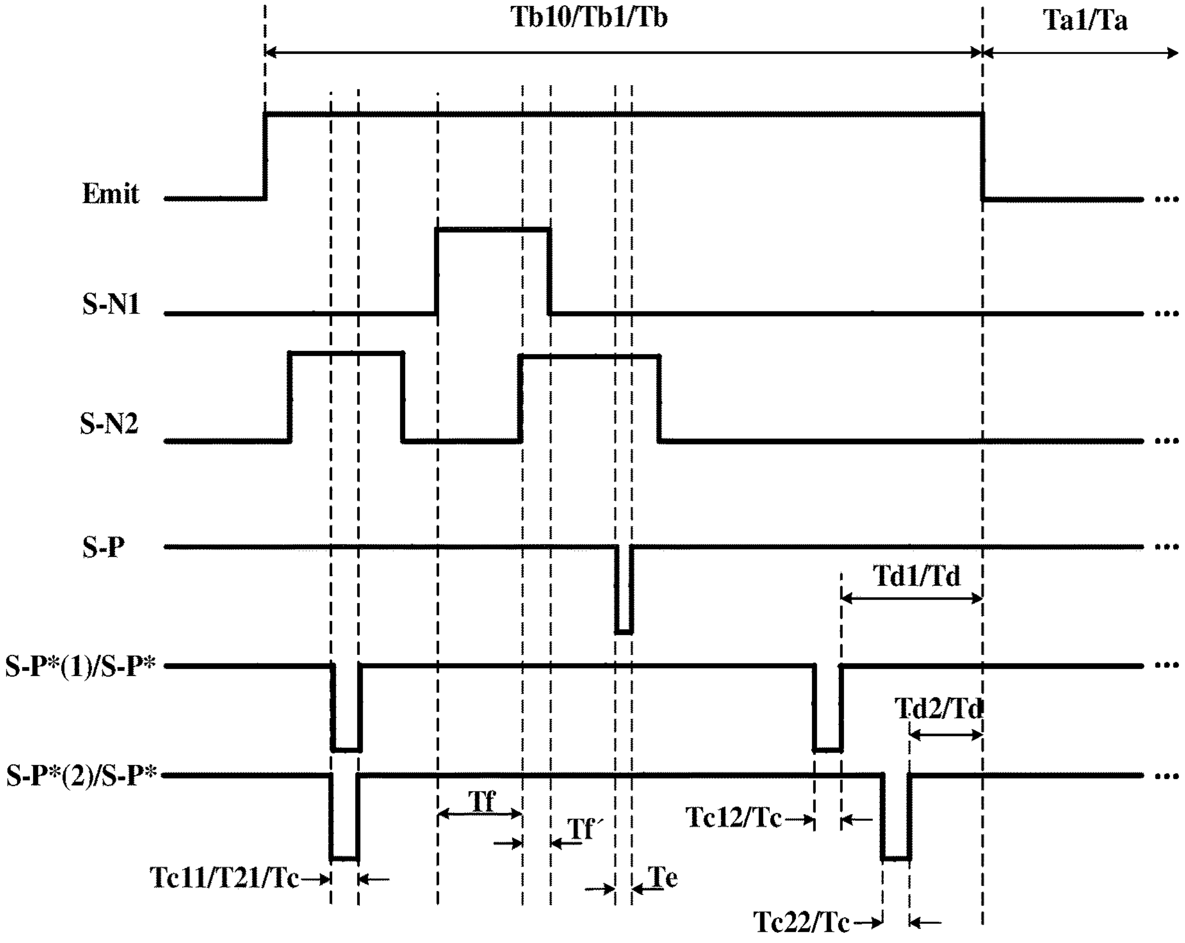
FIG. 12 is a driving timing diagram of a pixel circuit in yet another display panel according to an embodiment of the present disclosure.

Exemplarily, FIG. 12 is a driving timing diagram of a pixel circuit in yet another display panel according to an embodiment of the present disclosure. Referring to FIG. 10 and FIG. 12, taking it as an example that the first non-light emission stage Tb1 of each frame image is the first non-light emission stage Tb10, after the light emission stage of a previous frame image ends, it may enter a non-light emission stage Tb of a next frame image (i.e., the first non-light emission stage Tb10). In the light emission stage of the previous frame image, the driving transistor M1 is required to provide a driving current to the light-emitting element 200, to drive the light-emitting element 200 to emit light, so that a voltage difference is presented between the gate and the source and drain of the driving transistor M1, causing the driving transistor M1 to be in a biased state, therefore, when it enters the non-light emission stage Tb of the next frame image, a bias adjustment can be performed on the driving transistor M1 first, that is, it enters a first bias adjustment stage Tc11/Tc21, in this case, the bias adjustment control signal S-P* controls the bias adjustment module 12 to be turned on, and the scan signal S-N2 controls the compensation module 14 to be turned on, so that the bias adjustment signal Vpark is written to the node N2, and is transmitted to the node N3 through the driving transistor M1, and is transmitted to the node N1 through the compensation module 14. At this time, the potential of each of the gate, source and drain of the driving transistor M1 is maintained consistent with the voltage of the bias adjustment signal Vpark, so that the driving transistor M1 transitions from a biased state of the light emission stage of the previous frame image to a non-biased state. After the bias adjustment on the driving transistor M1 is completed, it may enter the initialization stage Tf, the scan signal S-N1 controls the initialization module 15 to be turned on, and the initialization signal Vref1 is written to the node N1 to initialize the gate of the driving transistor M1, making preparation for the subsequent writing of the data signal Vdata. After initializing the gate of the driving transistor M1, it may enter a next initialization stage Tf'. At this time, the initialization module 15 is continued to maintain the on state, while the compensation module 14 may also maintain the on state, so that the initialization signal Vref1 is transmitted to the node N3, that is, to the drain of the driving transistor M1. At this time, the potentials of the drain and the gate of the driving transistor M1 remain the same, both of which are the initialization signal Vref1, to further perform bias adjustment on the driving transistor M1 and make preparation for the writing of the data signal Vdata. After the initialization stage Tf' ends, it may enter the data writing stage Te. At this time, the compensation module 14 continues to maintain the on state, while the scan signal S-P controls the data writing module 13 to be turned on. The data signal Vdata is written to the gate of the driving transistor M1 sequentially through the data writing module 13, the driving transistor M1 and the compensation module 14, and a threshold voltage Vth of the driving transistor M1 is compensated to the gate of the driving transistor M1, so that when the data writing stage Te ends, the potential of the gate of the driving transistor M1 is Vdata+Vth. After the writing of the data signal Vdata is completed, it may enter a second bias adjustment stage Tc12/Tc22, so that the bias adjustment control signal S-P* once again controls the bias adjustment module 12 to be turned on, and the bias adjustment signal Vpark is written again into the source and drain of the driving transistor M1 so that the bias adjustment is performed on the driving transistor M1 again, thus ensuring that in the subsequent light emission stage Ta, the potentials of the source and the drain of the driving transistor M1 in each pixel circuit can be kept consistent, thereby improving the display uniformity of the display panel.

It may be appreciated that, in different operation modes, data signals Vdata written to the gate of the driving transistor M1 in the data writing stages are different, so that after the data writing stages, the driving transistor M1 may have different states. Therefore, the duration of the second bias adjustment stage Tc12 and/or the duration of the bias maintaining stage Td1 in the first mode may be set different from the duration of the second bias adjustment stage Tc22 and/or the duration of the bias maintaining stage Td1 in the second mode.

It is to be noted that FIG. 12 shows only a part of stages of one frame display image. In an embodiment of the present disclosure, in the case where one frame image includes multiple light emission stages and multiple non-light emission stages, for the setting manner for other non-light emission stages and light emission stages, reference may be made to the foregoing description, and details are not described herein again.

Optionally, with reference to FIG. 2 (or any drawing in FIG. 3 and FIG. 10 and FIG. 11) and FIG. 4 (or any drawing in FIG. 5 and FIG. 6 and FIG. 8 and FIG. 9), the pixel circuit 100 may further include a light emission control module 16. The light emission control module 16 can control the time for the driving transistor M1 to provide the driving current to the light-emitting element 200. The light emission control module 16 may be connected to the light-emitting element 200 and the driving transistor M1 in series between the positive power supply signal terminal and the negative power supply signal terminal.

In an exemplary embodiment, the light emission control module 16 may include a first light emission control transistor M6 and a second light emission control transistor M7, both a gate of the first light emission control transistor M6 and a gate of the second light emission control transistor M7 receive a light emission control signal Emit, a first electrode of the first light emission control transistor M6 receives a positive power supply signal PVDD, a second electrode of the first light emission control transistor M6 is electrically connected to the source of the driving transistor M1, a first electrode of the second light emission control transistor M7 is electrically connected to the drain of the driving transistor M1, and a second electrode of the second light emission control transistor M7 is electrically connected to an anode of the light-emitting element 200. The light emission control signal Emit may be a pulse signal. In a case where both the first light emission control transistor M6 and the second light emission control transistor M7 are NMOS-type transistors, a high level of the light emission control signal Emit controls the first light emission control transistor M6 and the second light emission control transistor M7 to be turned on, while a low level of the light emission control signal Emit controls the first light emission control transistor M6 and the second light emission control transistor M7 to be turned off. In a case where both the first light emission control transistor M6 and the second light emission control transistor M7 are PMOS-type transistors, a low level of the light emission control signal Emit controls the first light emission control transistor M6 and the second light emission control transistor M7 to be turned on, and a high level of the light emission control signal Emit controls the first light emission control transistor M6 and the second light emission control transistor M7 to be turned off. In this way, by controlling a duty cycle of the light emission control signal Emit, the duration of the on state of the first light emission control transistor M6 and the duration of the on state of the second light emission control transistor M7 can be controlled.

It may be appreciated that when the first light emission control transistor M6 and the second light emission control transistor M7 are turned on at the same time, the positive power supply signal PVDD can be transmitted through the first light emission control transistor M6 to the source of the driving transistor M1, so that the driving transistor M1 is turned on and generates a driving current, and the driving current generated by the driving transistor M1 can be transmitted to the anode of the light-emitting element 200 through the turned-on second light emission control transistor M7, so that the light-emitting element 200 emits light, that is, the stage in which the first light emission control transistor M6 and the second light emission control transistor M7 are turned on at the same time is a light emission stage Ta, while the stage in which the first light emission control transistor M6 and the second light emission control transistor M7 are turned off is a non-light emission stage Tb. By controlling the duty cycle of the light emission control signal Emit, the duration of the light emission stage Ta can be controlled.

In this way, when at least one of the bias adjustment stages Tc and the bias maintaining stages Td in different operation modes of the display panel 10 is different, the duration of at least one of the bias adjustment stages Tc and the bias maintaining stages Td may be controlled by adjusting a relative time between the start moment and/or end moment of the enable level of the bias adjustment control signal S-P* provided to the bias adjustment module 12 and the start moment of the enable level of the light emission control signal Emit provided to the light emission control module 16.

It is to be noted that, In FIG. 2 the driving transistor M1 being of a PMOS-type transistor is simply taken as an example, to illustrate the connection and light emission of the first light emission control transistor M6 and the second light emission control transistor M7. However, in other embodiments of the present disclosure, correspondingly, as shown in FIG. 3, the driving transistor M1 may further be an NMOS-type transistor, and in this case, the second electrode of the first light emission control transistor M6 is electrically connected to the drain of the driving transistor M1, and the first electrode of the second light emission control transistor M7 is electrically connected to the source of the driving transistor M1.

It is to be noted that the foregoing embodiments are described by taking it as an example that the data writing module 13 and the bias adjustment module 12 are two different modules respectively, however, in an embodiment of the present disclosure, this may be another case.

Figure 13:
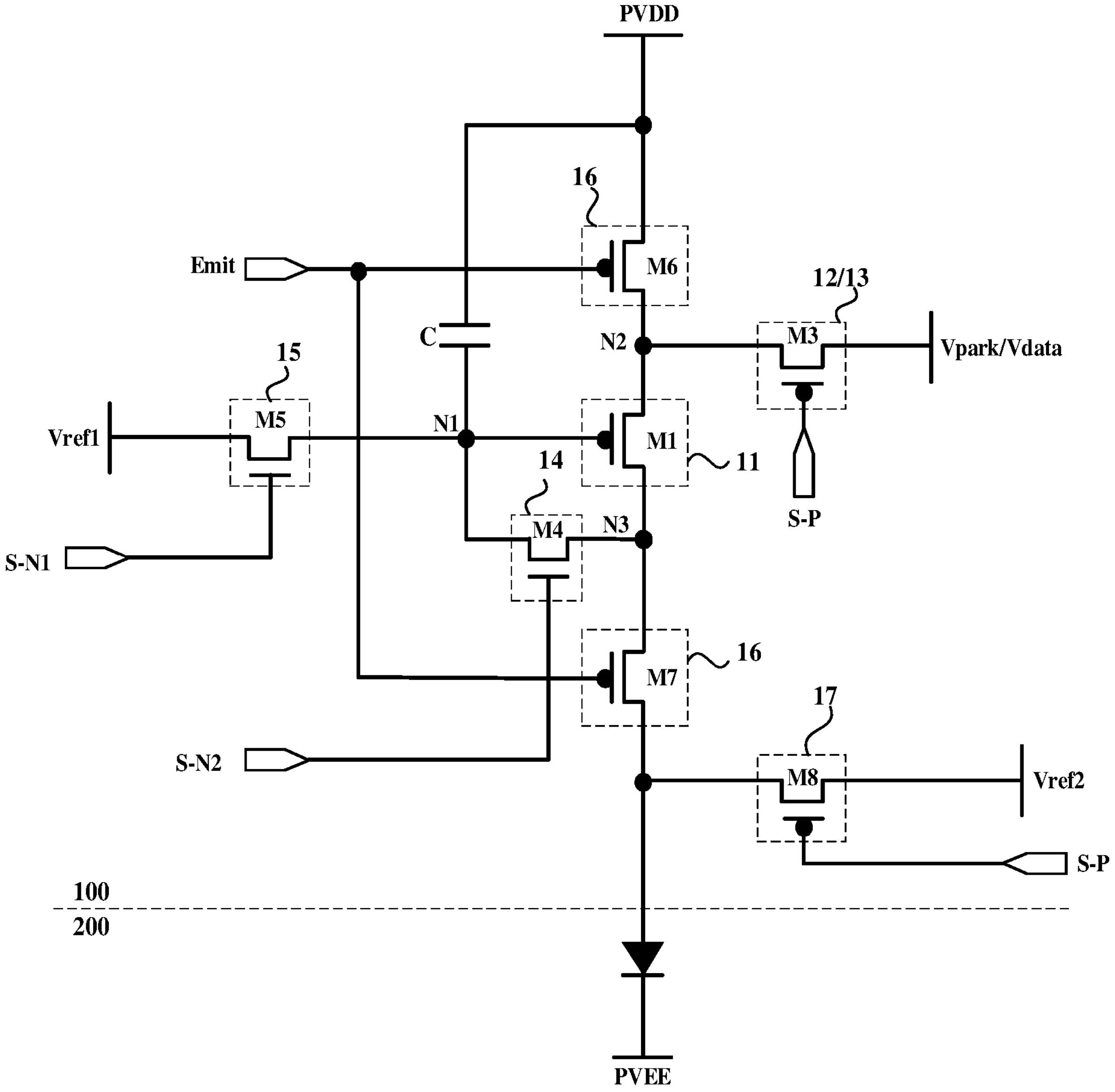
FIG. 13 is a schematic structural diagram of a pixel circuit in another display panel according to an embodiment of the present disclosure.
Figure 14:
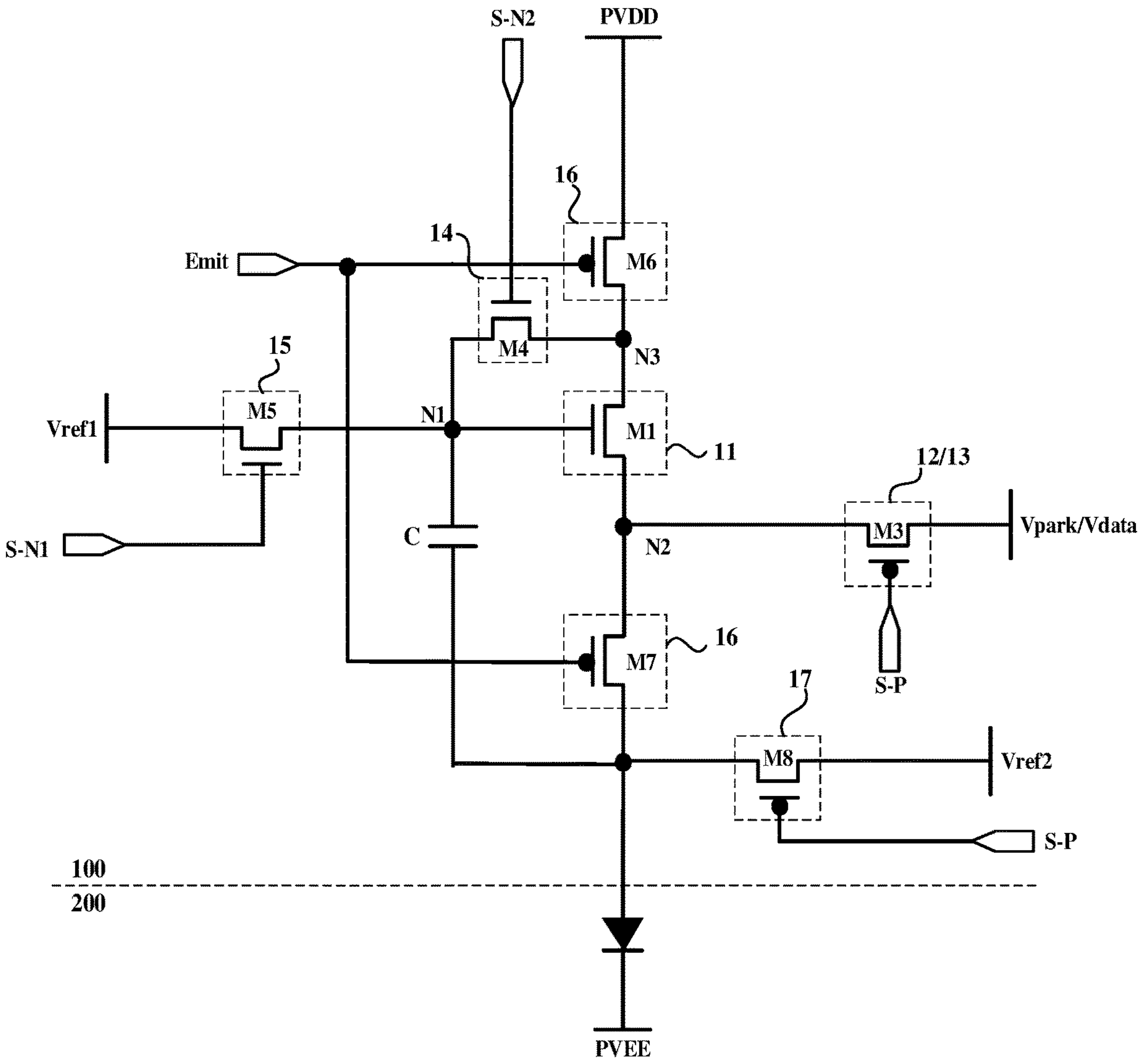
FIG. 14 is a schematic structural diagram of a pixel circuit in another display panel according to an embodiment of the present disclosure.

Optionally, FIG. 13 is a schematic structural diagram of a pixel circuit in another display panel according to an embodiment of the present disclosure. FIG. 14 is a schematic structural diagram of a pixel circuit in another display panel according to an embodiment of the present disclosure. Referring to any drawing in FIG. 13 and FIG. 14, the data writing module 13 may further serve as the bias adjustment module 12.

Figure 15:
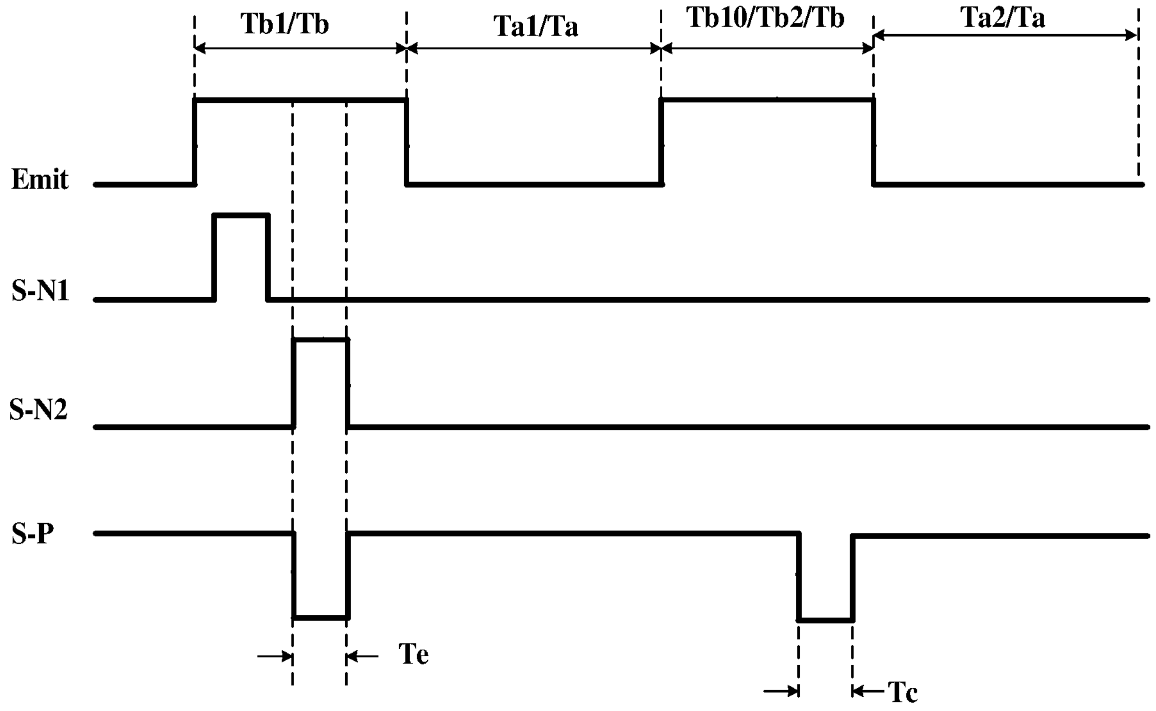
FIG. 15 is an operation timing diagram of a pixel circuit in another display panel according to an embodiment of the present disclosure.

Exemplarily, it is taken as an example that the data writing module 13 includes a PMOS-type data writing transistor M3. FIG. 15 is an operation timing diagram of a pixel circuit in another display panel according to an embodiment of the present disclosure. Referring to FIG. 13 and FIG. 14, the time of the data writing stage Te and the time of the bias adjustment stage Tc do not overlap, that is, the writing of the data signal Vdata and the writing of the bias adjustment signal Vpark are performed in separate time, therefore, enable levels of the scan signal S-P may be provided to the data writing transistor M3 in each of the data writing stage Te and the bias adjustment state Tc, so that, in the data writing stage Te, the data writing transistor M3 can write the data signal Vdata into the gate of the driving transistor M1, and in the bias adjustment stage Tc, the data writing transistor M3 can provide the bias adjustment signal Vpark to the source and drain of the driving transistor M1. In this way, it is not necessary to additionally provide the bias adjustment module, and the structure of the pixel circuit 100 can be simplified, which facilitates the improvement of the number of the pixel circuits 100 in unit area of the display panel 10, thereby improving the resolution of the display panel 10. Moreover, in the case where the data writing module 13 further serves as the bias adjustment module, the number of signals provided to the pixel circuit 100 can be reduced, thereby facilitating the simplification of the structure of the shift register circuit 300 of the non-display region 120 in the display panel 10, and facilitating realization of a narrow bezel of the display panel 10.

It may be appreciated that the above described pixel circuits and their driving timing diagrams are only exemplary drawings of embodiments of the present disclosure. On the premise that bias situations of the driving transistor can be adjusted to different degrees for different operation modes, specific setting manners of the bias adjustment stages and the bias maintaining stages in different operation modes are not limited in embodiments of the present disclosure.

In an optional embodiment, a relation between a duration t of the bias maintaining stage and a brightness DBV of the display panel 10 is:

$$t-0.25*T\le\left(\frac{t2-t1}{DBV2-DBV1}\right)(DBV-DBV1)+t1\le t+0.25*T,$$

Where, DBV1 is a brightness of the display panel in the first mode, and t1 is a duration of the bias maintaining stage in the first mode, DBV2 is a brightness of the display panel in the second mode, t2 is a duration of the bias maintaining stage in the second mode, and T is a duration of the first non-light emission stage.

It may be appreciated that, the DBV1 may be a display brightness of the display panel when a data signal corresponding to the highest level of brightness is provided to each of the pixel circuits of the display panel in the first mode; and the DBV2 may be a display brightness of the display panel when a data signal corresponding to the highest level of brightness is provided to each of the pixel circuits of the display panel in the second mode, so that, through adjusting the relationship between the grayscale and the data signal, the display panel presents different brightnesses in different operation modes, and brightness levels of light emission of the light-emitting element include 0-255, i.e., a total of 256 grayscales. For the same pixel circuit, a data signal corresponding to 255 grayscale in the first mode is different from a data signal corresponding to 255 grayscale in the second mode. In the first mode, each pixel circuit of the display panel is provided with the data signal corresponding to its 255 grayscale, so that the display brightness presented by the display panel may be the DBV1. In the second mode, each pixel circuit of the display panel is provided with the data signal corresponding to its 255 grayscale, so that the display brightness presented by the display panel may be the DBV2. In this way, when the data signals corresponding to the 255 grayscale are provided to the pixel circuits of the display panel, and the driving modules of the pixel circuits drive the light-emitting elements to emit light, the display brightnesses of the display panel in different operation modes may be tested by using a corresponding brightness test device.

Correspondingly, in the first mode, after the data signals corresponding to the 255 grayscale in this mode are provided to the pixel circuits of the display panel, the duration of the bias maintaining stage is adjusted, so that when the light-emitting elements emit light in the light emission stage, the brightness of the display panel is the DBV1, and in this case, the duration of the bias maintaining stage is just the duration t1 of the bias maintaining stage that should be set to in the first mode. Similarly, in the second mode, after the data signals corresponding to the 255 grayscale in this mode are provided to the pixel circuits of the display panel, the duration of the bias maintaining stage is adjusted, so that when the light-emitting elements emit light in the light emission stage, the brightness of the display panel is the DBV2, and in this case, the duration of the bias maintaining stage is just the duration t2 of the bias maintaining stage that should be set to in the second mode.

It is to be noted that, in the process of practical test, it is possible to determine, for different operation modes, durations of the bias maintaining stages corresponding to the operation modes separately, so as to determine a relationship curve between the brightnesses and the bias maintaining stages, and determine a corresponding relation based on the relationship curve.

Figure 16:
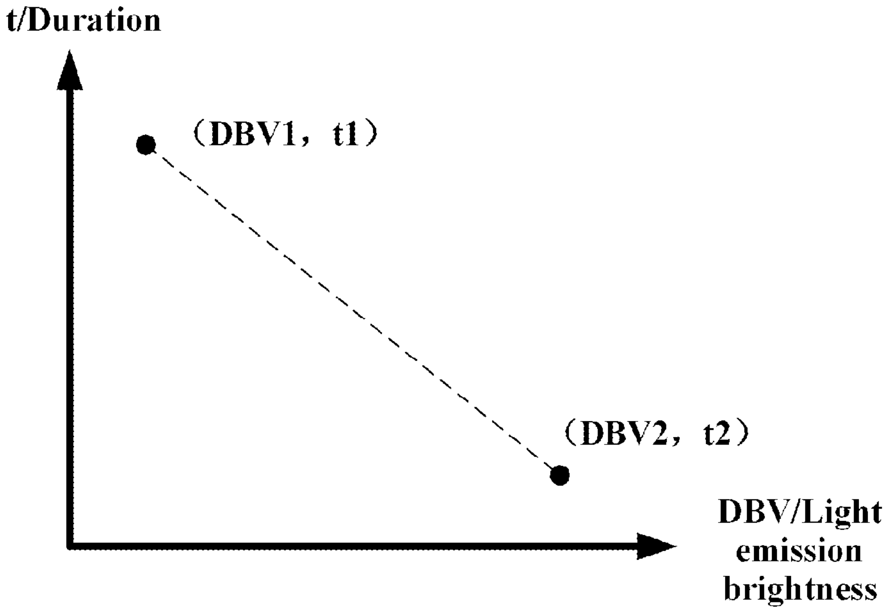
FIG. 16 is a schematic diagram of a relationship curve between brightnesses of a display panel and bias maintaining stages according to an embodiment of the present disclosure.

Exemplarily, FIG. 16 is a schematic diagram of a relationship curve between brightnesses of a display panel and bias maintaining stages according to an embodiment of the present disclosure. Referring to FIG. 13, FIG. 15, and FIG. 16, the display brightness DBV and the duration t of the bias maintaining stage Td satisfy a linear relationship. In this case, it may determine, based on the brightness DBV1 of the display panel and the duration t1 of the bias maintaining stage Td1 in the first mode and the brightness DBV2 of the display panel and the duration t2 of the bias maintaining stage Td2 in the second mode, a brightness linear relation:

$$\left(\frac{t2-t1}{DBV2-DBV1}\right)(DBV-DBV1)+t1.$$

In this way, when the display panel displays one frame image, the operation mode of the display panel for displaying the frame image can be acknowledged in advance, that is, the DBV corresponding to the frame image can be determined in advance. The DBV is substituted in the above relation, time t0 may just be determined, and based on the time to, it may determine a value upper limit t0+0.25*T and a value lower limit t0–0.25*T of the duration t of the bias maintaining stage Td corresponding to the operation mode, from this, the required duration t of the bias maintaining stage Td in any display brightness DBV can be derived. In addition, by taking the value of the duration t of the bias maintaining stage Td from the range from t0–0.25*T to t0+0.25*T, the bias maintaining stage Td is enabled to meet different display control requirements on the premise of within the first non-light emission stage Tb.

Optionally, with further reference to FIG. 7, FIG. 13, and FIG. 15, a correction relation of the duration t of the bias maintaining stage Td is:

$$t'=\left[\frac{t-t1}{H}\right]*H+t1,\text{ or }t'=\left[\frac{t-t1}{H}\right]*H+t1+H,$$

Where, t' is a duration of the bias maintaining stage Td after being corrected, $$\left[\frac{t-t1}{H}\right]$$

is a rounded down value of $$\frac{t-t1}{H},$$

H=1/(F*Lines), F is a refresh rate of the display panel, and Lines is the number of lines of the pixel circuits 100 in the display panel.

Exemplarily, in a case where the bias adjustment module 12 includes a bias adjustment transistor M2, and the bias adjustment transistor M2 is turned on or off under the control of the bias adjustment control signal S-P*, the bias adjustment control signal S-P* is provided by the corresponding shift register circuit 300. The bias adjustment control signals S-P* output by the shift register units 310 of the shift register circuit 300 can be used to scan the pixel circuits 100 line by line, and the durations of scanning the lines of the pixel circuits 100 are controlled by corresponding horizontal synchronization signals, in this case, a duration t of a bias maintaining stage Td may be determined according to the above linear relation between the brightness and the bias maintaining stage, to determine, based on the duration t of the bias maintaining stage Td, a start moment and an end moment of the bias adjustment stage Tc. However, since there is a case where the duration t of the bias maintaining stage Td is not an integer multiple of the duration for scanning one line of pixel circuits 100, in this way, when to switch the mode of the display panel, the translation amount of the start moment and end moment of the bias adjustment stage Tc determined based on the duration t of the bias maintaining stage Td is not an integer multiple of the duration for scanning one line of pixel circuits 100, thereby the horizontal synchronization signal is required to be adjusted correspondingly, so that a complicated control method is required to implement the translation of the bias adjustment stage Tc.

Based on the issue described above, after the duration of the bias maintaining stage corresponding to the current frame image is determined, the correction relation of the duration of the bias maintaining stage may be used to correct the duration t of the bias maintaining stage Td calculated by using the above linear relation between the brightness and the bias maintaining stage, to allow the corrected duration t' of the bias maintaining stage Td to be an integer multiple of the duration H of the bias adjustment stage Tc, that is, the corrected duration t' of the bias maintaining stage Td is an integer multiple of the duration for scanning one line of pixel circuits, thus, when to switch the mode of the display panel, the length of the horizontal synchronization signal is not required to be changed, and it is only required to simply translate certain control signal or signals provided to the shift register circuit, the switching may just be realized, which further facilitates the simplification of the control manner of the display panel, improvement of the mode switching speed of the display panel, and facilitates meeting the high quality display requirements of the display panel.

It may be appreciated that, in the above correction relation, $$\left[\frac{t-t1}{H}\right]$$

is rounded down, that is, when $$\frac{t-t1}{H}=1.6,\left[\frac{t-t1}{H}\right]$$

is equal to 1; and when $$\frac{t-t1}{H} = 1.4, \left[\frac{t-t1}{H}\right]$$

is also equal to 1. In this way, after the duration t1 of the bias maintaining stage Td1 in the first mode is determined, when to perform mode switching, the mode switching can be implemented by translating the times of the enable levels of the bias adjustment control signals S-P* on the basis of the duration t1 of the bias maintaining stage Td1 in the first mode. When the corrected duration t' of the bias maintaining stage Td of one frame image satisfies $$t' = \left[\frac{t-t1}{H}\right] * H + t1,$$

the bias adjustment control signals S-P* of the frame image are translated leftward $$\left[\frac{t-t1}{H}\right]$$

times of durations of enable levels of the bias adjustment control signals S-P*. When the corrected duration t' of the bias maintaining stage Td of one frame image satisfies $$t' = \left[\frac{t-t1}{H}\right] * H + tl + H,$$

the bias adjustment control signals S-P* of the frame of image are translated leftward $$\left[\frac{t-t1}{H}\right] + 1$$

times of durations of enable levels of the bias adjustment control signals S-P*.

It is to be noted that the display panel may include multiple pixel circuits arranged in an array, and a duration for the display panel to display one frame image is a reciprocal of the refresh rate F, that is, 1/F. After the duration for the display panel to display one frame image is learned, an average duration for scanning each line of pixels may be further determined, and the duration is H=1/(F*Lines).

It may be appreciated that, the foregoing only takes it as an example that the bias adjustment stage Tc is a consecutive time period, to exemplarily describe the technical solutions of the embodiments of the present application, however, in some embodiments of the present application, the bias adjustment stage Tc may also be nonconsecutive multiple stages.

Optionally, referring to any one of FIG. 2 and FIG. 3, FIG. 10 and FIG. 11, and FIG. 12 and FIG. 13, when a first electrode of the driving transistor M1 is the source or drain of the driving transistor M1, and the bias adjustment module 12 is electrically connected between the bias adjustment signal terminal and the first electrode of the driving transistor M1, each bias adjustment stage Tc includes at least two bias adjustment sub-stages Tc'. In each of the bias adjustment sub-stages Tc', the bias adjustment module 12 is turned on, and in a time period between adjacent two bias adjustment sub-stages Tc', the bias adjustment module 12 is turned off.

Figure 17:
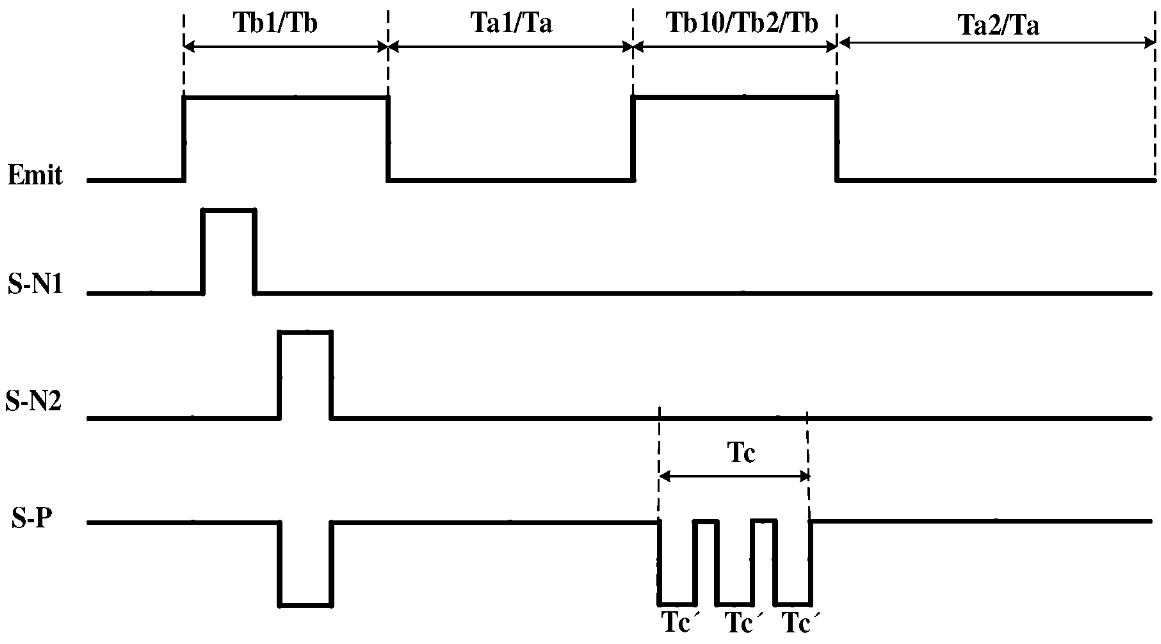
FIG. 17 is a driving timing diagram of a pixel circuit in yet another display panel according to an embodiment of the present disclosure.

Exemplarily, it is taken as an example that the bias adjustment module includes the bias adjustment transistor M2, the bias adjustment transistor M2 further serves as a data writing transistor, and the bias adjustment transistor M2 is a PMOS-type transistor electrically connected to the source of the driving transistor M1. FIG. 17 is a driving timing diagram of a pixel circuit in still another display panel according to an embodiment of the present disclosure. With reference to FIG. 13 and FIG. 17, before it enters the bias adjustment stage Tc, the source of the driving transistor M1 may receive a positive power supply signal PVDD, to allow the driving transistor M1 to generate a corresponding driving current, such that at a start moment of the bias adjustment stage Tc, it is required to write the bias adjustment signal Vpark on the basis of the positive power supply signal PVDD, which may have a certain adverse effect on writing of the bias adjustment signal Vpark. In this case, the bias adjustment stage Tc is divided into multiple bias adjustment sub-stages Tc', so that in a first bias adjustment sub-stage Tc', when to provide the bias adjustment signal Vpark to the source of the driving transistor M1, a part of the bias adjustment signal Vpark is written into the source of the driving transistor M1 on the basis of the positive power supply signal, to reduce a voltage difference between the source potential of the driving transistor M1 and the bias adjustment signal Vpark, while in a next bias adjustment stage Tc', the bias adjustment signal Vpark can be further written into the source of the driving transistor M1 on the basis of the signal written in the last bias adjustment sub-stage Tc', to further reduce the difference between the source potential of the driving transistor M1 and the bias adjustment signal Vpark. By parity of reasoning, through setting multiple bias adjustment sub-stages Tc' in one bias adjustment stage Tc, the source potential of the driving transistor M1 can be maintained consistent with the bias adjustment signal Vpark, that is, the accurate writing of the bias adjustment signal Vpark can be ensured. Therefore, based on the accurate bias adjustment signal Vpark, the effect of the bias adjustment on the driving transistor M1 can be improved.

It is to be appreciated that when the bias adjustment stage Tc includes multiple bias adjustment sub-stages Tc', setting manners of the bias adjustment sub-stages Tc' in different operation modes may be the same or different. In an optional embodiment, by setting different bias adjustment sub-stages Tc' in different operation modes, the bias adjustment stages Tc are enabled to have different durations in different operation modes.

Figure 18:
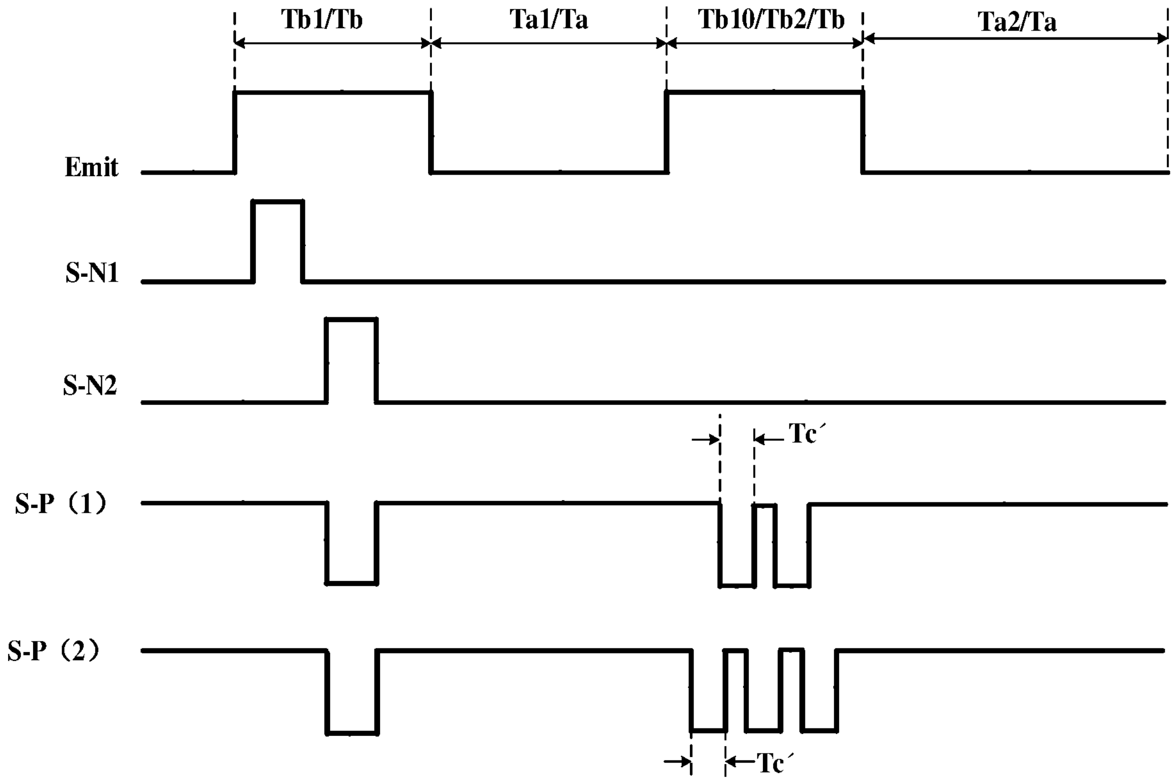
FIG. 18 is a driving timing diagram of a pixel circuit in yet another display panel according to an embodiment of the present disclosure.

In an optional embodiment, FIG. 18 is a driving timing diagram of a pixel circuit in another display panel according to an embodiment of the present disclosure. With reference to FIG. 13 and FIG. 18, the duration of each bias adjustment sub-stage Tc' in the first mode is the same as the duration of each bias adjustment sub-stage Tc' in the second mode, however, the number of the bias adjustment sub-stages Tc' in each bias adjustment stage Tc in the first mode is different from the number of the bias adjustment sub-stages Tc' in each bias adjustment stage Tc in the second mode.

Specifically, since the bias situation of the driving transistor M1 in the light emission stage in the first mode is different from the bias situation of the driving transistor M1 in the light emission stage in the second mode, in this case, if the durations of the bias adjustment sub-stages are the same, the number of the bias adjustment sub-stages Tc' included in the bias adjustment stage Tc can be adjusted to allow the total durations of the bias adjustment stages Tc in the first mode and the second mode to be different from each other, so that, the bias situations of the driving transistor M1 in the first mode and the second mode can be adjusted targetedly, thereby facilitating the realization of display uniformity of the display panel in different operation modes.

Figure 19:
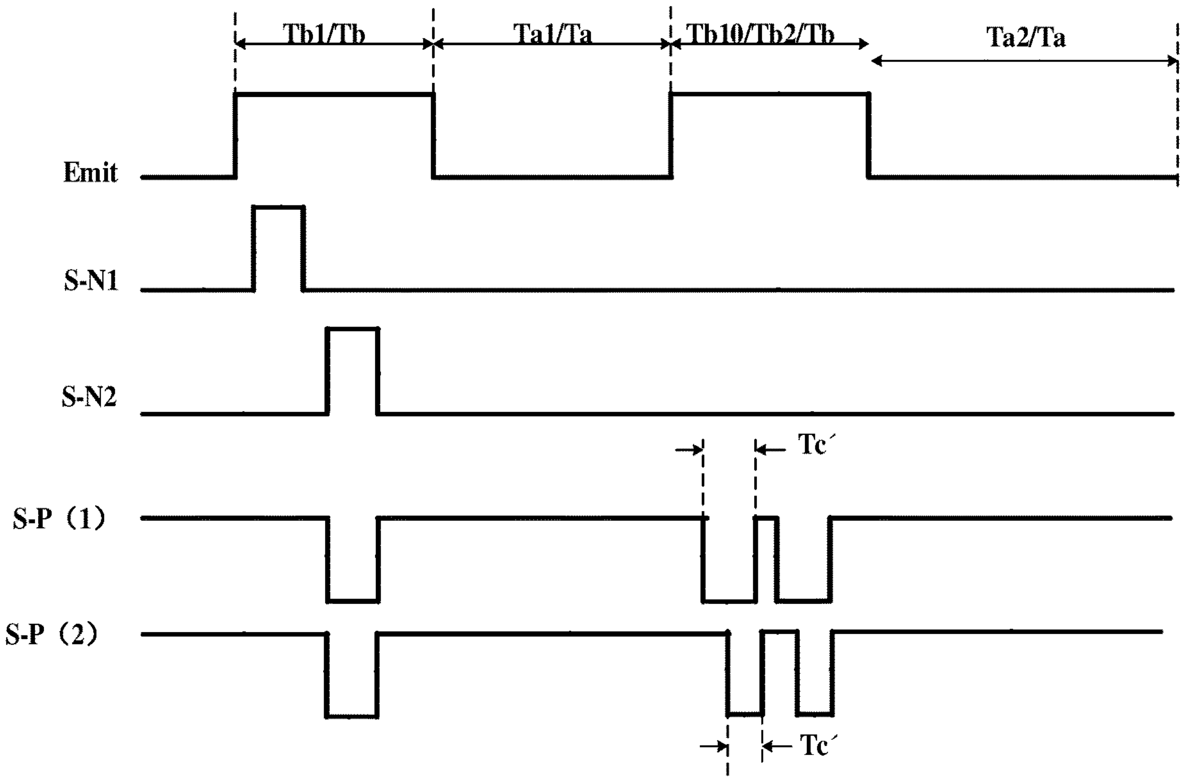
FIG. 19 is a driving timing diagram of a pixel circuit in yet another display panel according to an embodiment of the present disclosure.

In another optional embodiment, FIG. 19 is a driving timing diagram of a pixel circuit in still another display panel according to an embodiment of the present disclosure. Referring to FIG. 13 and FIG. 19, the duration of each bias adjustment sub-stage Tc' in the first mode is different from the duration of each bias adjustment sub-stage Tc' in the second mode. However, the number of the bias adjustment sub-stages Tc' in each bias adjustment stage Tc in the first mode is the same as the number of the bias adjustment sub-stages Tc' in each bias adjustment stage Tc in the second mode.

Specifically, in the case where the durations of the bias adjustment sub-stages Tc' in different operation modes are set different, however, the numbers of the bias adjustment sub-stages Tc' in each bias adjustment stage Tc in different operation modes are the same, the durations of the bias adjustment stages Tc in different operation modes may be different as well, thus, it is ensured to perform differential adjustments on the bias situations of the driving transistor M1 in different operation modes, thereby facilitating realization of display uniformity of the display panel in different operation modes.

Optionally, in the same first non-light emission stage, an end moment of the bias adjustment stage is earlier than an end moment of the first non-light emission stage.

Exemplarily, with reference to FIG. 13 and FIG. 19, in the first non-light emission stage Tb10, the driving transistor M1 stops providing the driving current to the light-emitting element 200, and the light-emitting element 200 does not emit light. However, when the end moment of the first non-light emission stage Tb10 arrives, it enters the light emission stage Ta again. At this time, the driving transistor M1 is required to provide the driving current for the light-emitting element 200. When the first non-light emission stage Tb10 ends and it enters the light emission stage Ta again, the source of the driving transistor M1 should receive a positive power supply signal PVDD, and the driving transistor M1 generates a corresponding driving current based on the positive power supply signal PVDD and the gate potential of the driving transistor M1. In this way, the end moment of the bias adjustment stage Tc is set before the end moment of the first non-light emission stage Tb10, so that when a next light emission stage Ta arrives, it stops providing the bias adjustment signal Vpark to the source and/or drain of the driving transistor M1, to prevent the bias adjustment signal from adversely affecting writing of the positive power supply signal PVDD which may cause the driving transistor M1 not to accurately generate the driving current, thereby improving accuracy of the driving current generated by the driving transistor M1, facilitating accuracy of the display and light emission of the light-emitting element 200, and further improving the display quality of the display panel.

It may be appreciated that, in an embodiment of the present disclosure, the first non-light emission stage may be a first non-light emission stage of a frame image, or it may be other non-light emission stages of a frame image, which is not specifically limited in the embodiments of the present application on the premise that bias adjustment can be performed on the driving transistor M1.

In an optional embodiment, with further reference to FIG. 13 and FIG. 19, the first non-light emission stage Tb10 is after at least a part of at least one light emission stage Ta in the time of one frame image of the display panel.

Specifically, in the light emission stage Ta, the source of the driving transistor M1 receives the positive power supply signal PVDD, to enable the driving transistor M1 to generate a driving current, the driving current generated by the driving transistor M1 will charge the node N3 to which the drain of the driving transistor M1 is electrically connected, so that the potential of its drain is equivalent to the potential of the node N3 to which power is charged. During this period, there is a difference between the gate potential of the driving transistor M1 and the source and drain potential of the driving transistor M1, resulting in polarization of ions inside the driving transistor M1, and further causing a built-in electric field formed inside the driving transistor M1, and resulting in continuous shift of the threshold voltage of the driving transistor, so that the driving transistor M1 is biased, that is, the driving transistor M1 requires bias adjustment. In this case, by setting the first non-light emission stage Tb10 after at least a part of at least one light emission stage Ta, it is possible to enter the bias adjustment stage of the first non-light emission stage Tb10 after the driving transistor M1 has been biased for a period of time, so as to perform bias adjustment on the driving transistor M1, thereby ensuring that the driving transistor M1 can accurately provide the driving current in the next light emission stage Ta, and ensuring accurate light emission of the light-emitting element 200, to further improve the display effect of the display panel.

On the basis of the embodiments described above, referring to any drawings in FIG. 2 and FIG. 3, FIG. 10 and FIG. 11, and FIG. 13 and FIG. 14, the pixel circuit 100 may further include a reset module 17. The reset module 17 can provide a reset signal Vref2 to the anode of the light-emitting element 200 in the reset stage, so as to reset the anode of the light-emitting element 200, to prevent a signal provided to the anode of the light-emitting element 200 in a previous light emission stage from adversely affecting accuracy of light emission of the light-emitting element 200 in a current light emission stage. In this way, the reset stage for the reset module 17 to provide the reset signal Vref2 to the light-emitting element 200 should be in the non-light emission stage prior to the light emission stage. For example, the data writing stage may further serve as the reset stage, in this case, the scan signal S-P for controlling the data writing module 13 may further serve as a scan signal for controlling the reset module 17.

In one exemplary embodiment, one terminal of the reset module 17 may receive the reset signal Vref2, and another terminal of the reset module 17 may be electrically connected to the anode of the light-emitting element 200. The reset module 17 may be turned on or off under the control of the scan signal S-P, and when the scan signal S-P controls the reset module 17 to be turned on, the reset module 17 can transmit the reset signal Vref2 to the anode of the light-emitting element 200, so as to reset the light-emitting element 200. In this case, the reset module 17 may include a reset transistor M8. A gate of the reset transistor M8 may receive the scan signal S-P, a first electrode of the reset transistor M8 may receive the reset signal Vref2, and a second electrode of the reset transistor M8 may be electrically connected to the anode of the light-emitting element 200. The reset transistor M8 may be an NMOS-type transistor or a PMOS-type transistor. In the case where the reset transistor M8 is an NMOS-type transistor, and when the scan signal S-P is a high level, the reset transistor M8 is turned on, and when the scan signal S-P is a low level, the reset transistor M8 is turned off. In contrast, in the case where the reset transistor M8 is a PMOS-type transistor, and when the scan signal S-P is a low level, the reset transistor M8 is turned on, and when the scan signal S-P is a high level, the reset transistor M8 is turned off. Embodiments of the present disclosure impose no specific limitation on the type of the reset transistor M8.

The reset signal Vref2 and the initialization signal Vref1 may be the same or different, on which the embodiments of the present disclosure impose no specific limitation on the premises that accurate initialization for the driving transistor M1 can be implemented and accurate reset for the anode of the light-emitting element 200 can be implemented.

In addition, with further reference to any drawings of FIG. 2 and FIG. 3, FIG. 10 and FIG. 11, and FIG. 13 and FIG. 14, the pixel circuit 100 may further include a storage capacitor C, and the storage capacitor C may be configured to store the gate potential of the driving transistor M1. A specific connection manner of the storage capacitor C may be determined according to specific situations. On the premise that storage of the gate potential of the driving transistor M1 can be implemented, embodiments of the present disclosure impose no specific limitation on the connection manner of the storage capacitor.

Based on the same inventive concept, a driving method for a display panel is further provided according to an embodiment of the present disclosure, for driving the display panel according to the embodiments of the present disclosure. The display panel includes at least pixel circuits and light-emitting elements. A pixel circuit of the pixel circuits includes at least a driving module and a bias adjustment module. The driving module is configured to provide a driving current for a light-emitting element of the light-emitting elements in a light emission stage. The driving module includes a driving transistor. The bias adjustment module is configured to provide a bias adjustment signal for a source and/or drain of the driving transistor in a bias adjustment stage. The time of one frame image of the display panel includes at least one light emission stage and at least one non-light emission stage. At least a part of at least one non-light emission stage is a first non-light emission stage. The first non-light emission stage includes the bias adjustment stage. In the same first non-light emission stage, time between an end moment of the bias adjustment stage and an end moment of the first non-light emission stage is a bias maintaining stage.

Figure 20:
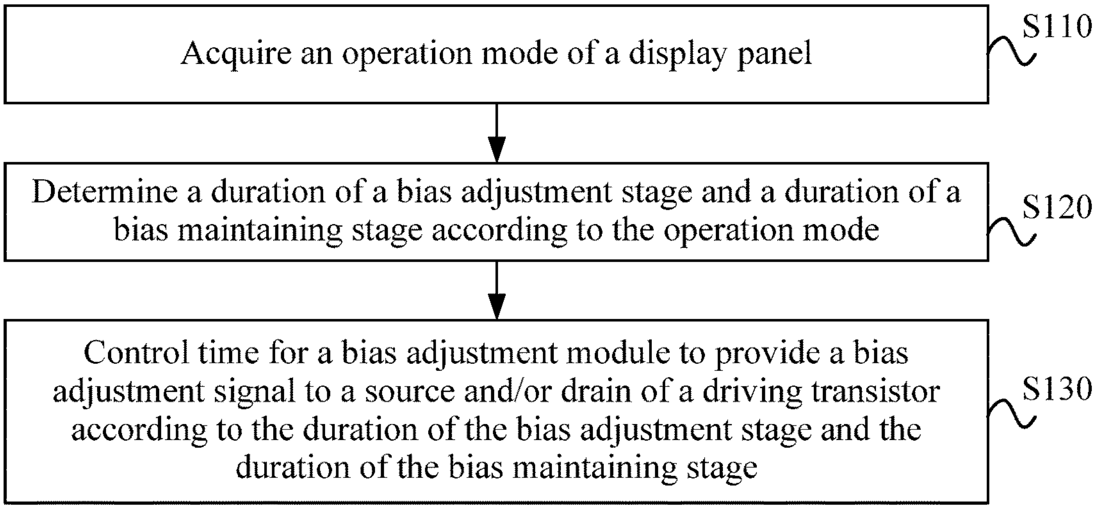
FIG. 20 is a schematic flowchart of a driving method for a display panel according to an embodiment of the present disclosure.

The driving method for a display panel according to an embodiment of the present disclosure may be performed by a driving chip in a display apparatus according to an embodiment of the present disclosure, and the driving chip may be arranged in a non-display region of the display panel to drive the display panel according to the embodiment of the present disclosure. FIG. 20 is a schematic flowchart of a driving method for a display panel according to an embodiment of the present disclosure. Referring to FIG. 20, the driving method specifically includes as follows.

In S110, an operation mode of a display panel is acquired.

The display panel may include multiple operation modes, for example, a first mode and a second mode, where the brightness in the first mode is different from the brightness in the second mode.

Specifically, the correspondence between a brightness level (for example, 0-255 grayscales) of display and light emission of the light-emitting element in the display panel and a voltage of the data signal in one operation mode is different from that in another operation mode, or duty cycles of the light emission stages of the display panel in different operation modes are different, so that display brightnesses that are finally presented by the display panel are different. When the display panel presents different brightnesses, the data signals provided to the driving transistor are different, or durations for the light-emitting element to emit light are different, resulting in different bias situations of the driving transistor, i.e., different shift situations of the threshold voltage of the driving transistor. When the display panel is to display a frame image, an operation mode of the display panel when the display panel displays the frame image may be known in advance, so that different degrees of bias adjustments can be performed on the driving transistor according to the different operation modes.

In S120, a duration of a bias adjustment stage and a duration of a bias maintaining stage are determined according to the operation mode.

When the operation mode of the display panel is the first mode and the operation mode of the display panel is the second mode, at least one of the durations of the bias adjustment stages and the durations of the bias maintaining stages is different.

Specifically, before the bias adjustment stage, when the data signal has been written into the gate of the driving transistor, it is taken as an example that the gate potential of the driving transistor includes only the data signal. In the bias adjustment stage, the bias adjustment module provides a bias adjustment signal to the source and/or drain of the driving transistor, so that the voltage difference between the gate of the driving transistor and the source and/or drain of the driving transistor is the difference between the data signal and the bias adjustment signal. In the bias maintaining stage, although the bias adjustment module stops providing the bias adjustment signals to the source and/or drain of the driving transistor, the voltages of the source and/or drain of the driving transistor remain equivalent to the bias adjustment signal since no other signals are provided to the source and/or drain of the driving transistor. In this way, in the bias adjustment stage and the bias maintaining stage, the voltage differences between the gate of the driving transistor and the source and/or drain of the driving transistor are each the voltage difference between the data signal and the bias adjustment signal, so that in the bias adjustment stage and the bias maintaining stage, the threshold voltage shift generated in the driving transistor in the light emission stage before the bias adjustment stage can be mitigated or offset. In addition, based on the difference of brightnesses in different operation modes, that is, the difference of the threshold voltage shifts of the driving transistor in different operation modes, the bias situations of the driving transistor can be differently adjusted in different modes, so as to targetedly adjust the bias situations of the driving transistor in different operation modes. In addition, on the premise that the bias situations of the driving transistor in the operation modes can be adjusted targetedly, the voltage of the bias adjustment signal provided by the bias adjustment module is not required to be changed, so that additional power consumptions caused by repeated charging and discharging of a circuit, a signal line, or the like due to a voltage change of the bias adjustment signal can be reduced, and further, power consumption of the display panel can be reduced when display uniformity of the display panel can be ensured.

In S130, time for the bias adjustment module to provide a bias adjustment signal to the source and/or drain of the driving transistor is controlled according to the duration of the bias adjustment stage and the duration of the bias maintaining stage.

Specifically, in different operation modes, that is, in the first mode and the second mode, the durations of the bias adjustment stages and/or the bias maintaining stages are different. In this case, the durations of the bias adjustment stages in the first mode and the second mode may be the same, while the durations of the bias maintaining stages in the first mode and the second mode are different, and in this case, the durations for the bias adjustment module to provide bias adjustment signals for the source and/or drain of the driving transistor in the first mode and the second mode are the same, however, the relative time of a start moment and end moment of the bias adjustment signal provided by the bias adjustment module for the source and/or drain of the driving transistor to an end moment of the first non-light emission stage in the first mode is different from that in the second mode; or the durations of the bias adjustment stages in the first mode and the second mode are different, however, the durations of the bias maintaining stages in the first mode and the second mode are the same, and in this case, the durations for the bias adjustment module to provide bias adjustment signals for the source and/or drain of the driving transistor in the first mode and the second mode are different, however, the relative time of the end moment of the bias adjustment signal provided by the bias adjustment module for the source and/or drain of the driving transistor to the end moment of the first non-light emission stage in the first mode is the same as that in the second mode; further or, the durations of the bias adjustment stages in the first mode and the second mode are different, and the durations of the bias maintaining stages in the first mode and the second mode are also different, and in this case, the durations for the bias adjustment module to provide bias adjustment signals for the source and/or drain of the driving transistor in the first mode and the second mode are different, and, the relative time of the start moment and end moment of the bias adjustment signal provided by the bias adjustment module for the source and/or drain of the driving transistor to the end moment of the first non-light emission stage in the first mode is also different from that in the second mode.

It may be appreciated that the relationships between the duration of the bias adjustment stage and the duration of the bias maintaining stage in different operation modes in the display panel may be set according to practical requirements, which is not specifically limited by embodiments of the present disclosure.

In conclusion, when the display panel is in different modes, the display panel presents different display brightnesses, and when the display panel presents different display brightnesses, the gate voltages of the driving transistor are different. In this case, by controlling at least one of the bias adjustment stages and the bias maintaining stages in different brightness modes to be different, times for the source and/or drain of the driving transistor to be kept as bias adjustment signals can be different, so as to specifically adjust the bias situation of the driving transistor in each brightness mode, thereby ensuring display uniformity in each of the different brightness modes. Furthermore, by controlling at least one of the bias adjustment stages and the bias maintaining stages in different brightness modes to be different, to specifically adjust the bias situation of the driving transistor in each brightness mode, the bias adjustment signal provided by a driving chip is not required to be changed, so that an additional power consumption caused by repeated charging and discharging of a circuit, a signal line or the like due to a change of the bias adjustment signal can be reduced, and a display effect of the display panel is ensured on the premise that a display uniformity of the display panel is improved.

It may be appreciated that the method of determining, according to the operation mode, the duration of the bias adjustment stage and the duration of the bias maintaining stage may be determining based on a relation table, determined by experiments, between operation modes and durations of bias adjustment stages and durations of bias maintaining stages, and may also be determining based on other methods.

Figure 21:
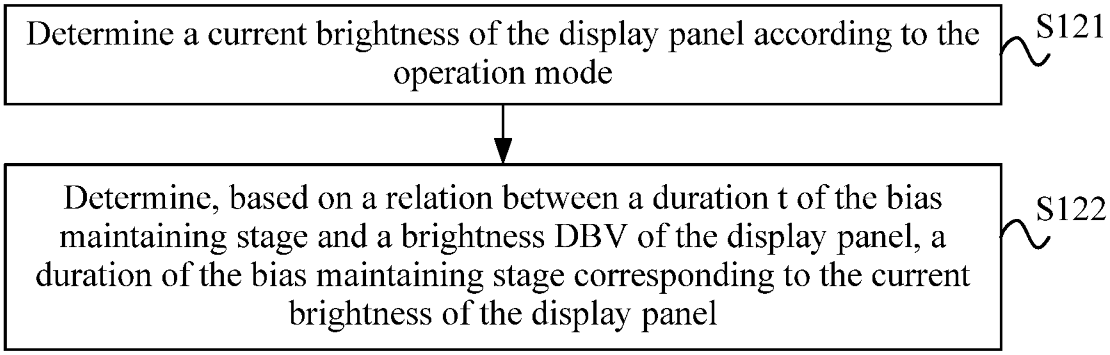
FIG. 21 is a schematic flowchart of a duration determining method for a bias maintaining stage according to an embodiment of the present disclosure.

In an optional embodiment, FIG. 21 is a schematic flowchart of a duration determining method for a bias maintaining stage according to an embodiment of the present disclosure. The method includes as follows.

In S121, a current brightness of the display panel is determined according to the operation mode.

Specifically, after the current operation mode of the display panel is determined, a display brightness expected to be presented by the display panel in the current operation mode may be learned. The display brightness DBV expected to be presented is a display brightness presented by the display panel when driving modules of pixel circuits drive light-emitting elements to emit light after the display panel provides, in the operation mode, data signals corresponding to the highest level of brightness for the pixel circuits.

In S122, a duration of the bias maintaining stage corresponding to the current brightness of the display panel is determined based on a relation between a duration t of the bias maintaining stage and a display brightness DBV of the display panel.

The duration t of the bias maintaining stage and the display brightness DBV of the display panel satisfy the relation:

$$t - 0.25 * T \le \left(\frac{t2 - t1}{DBV2 - DBV1}\right)(DBV - DBV1) + t1 \le t + 0.25 * T,$$

where, DBV1 is a brightness of the display panel in the first mode, and t1 is a duration of the bias maintaining stage in the first mode, DBV2 is a brightness of the display panel in the second mode, t2 is a duration of the bias maintaining stage in the second mode, and T is a duration of the first non-light emission stage.

It may be appreciated that, the DBV1 may be a display brightness of the display panel when a data signal corresponding to the highest level of brightness is provided to each of the pixel circuits of the display panel in the first mode; and the DBV2 may be a display brightness of the display panel when a data signal corresponding to the highest level of brightness is provided to each of the pixel circuits of the display panel in the second mode, so that, through adjusting the relationship between the grayscale and the data signal, the display panel presents different brightnesses in different operation modes, and brightness levels of light emission of the light-emitting element include 0-255, i.e., a total of 256 grayscales. For the same pixel circuit, a data signal corresponding to 255 grayscale in the first mode is different from a data signal corresponding to 255 grayscale in the second mode. In the first mode, each pixel circuit of the display panel is provided with the data signal corresponding to its 255 grayscale, so that the display brightness presented by the display panel may be the DBV1. In the second mode, each pixel circuit of the display panel is provided with the data signal corresponding to its 255 grayscale, so that the display brightness presented by the display panel may be the DBV2. In this way, when the data signals corresponding to the 255 grayscale are provided to the pixel circuits of the display panel, and the driving modules of the pixel circuits drive the light-emitting elements to emit light, the display brightnesses of the display panel in different operation modes may be tested by using a corresponding brightness test device.

Correspondingly, in the first mode, after the data signals corresponding to the 255 grayscale in this mode are provided to the pixel circuits of the display panel, the duration of the bias maintaining stage is adjusted, so that when the light-emitting elements emit light in the light emission stage, the brightness of the display panel is the DBV1, and in this case, the duration of the bias maintaining stage is just the duration t1 of the bias maintaining stage that should be set to in the first mode. Similarly, in the second mode, after the data signals corresponding to the 255 grayscale in this mode are provided to the pixel circuits of the display panel, the duration of the bias maintaining stage is adjusted, so that when the light-emitting elements emit light in the light emission stage, the brightness of the display panel is the DBV2, and in this case, the duration of the bias maintaining stage is just the duration t2 of the bias maintaining stage that should be set to in the second mode.

It is to be noted that, in the process of practical test, it is possible to determine, for different operation modes, durations of the bias maintaining stages corresponding to the operation modes separately, so as to determine a relationship curve between the brightnesses and the bias maintaining stages, and determine a corresponding relation based on the relationship curve.

Exemplarily, the display brightness DBV and the duration t of the bias maintaining stage Td satisfy a linear relationship. In this case, it may determine, based on the brightness DBV1 of the display panel and the duration t1 of the bias maintaining stage Td1 in the first mode and the brightness DBV2 of the display panel and the duration t2 of the bias maintaining stage Td2 in the second mode, a brightness linear relation:

$$\left(\frac{t2-t1}{DBV2-DBV1}\right)(DBV-DBV1)+t1.$$

In this way, when the display panel displays one frame image, the operation mode of the display panel for displaying the frame image can be acknowledged in advance, that is, the DBV corresponding to the frame image can be determined in advance. The DBV is substituted in the above relation, time t0 may just be determined, and based on the time to, it may determine a value upper limit t0+0.25*T and a value lower limit t0–0.25*T of the duration t of the bias maintaining stage Td corresponding to the operation mode, from this, the required duration t of the bias maintaining stage Td in any display brightness DBV can be derived. In addition, by taking the value of the duration t of the bias maintaining stage Td from the range from t0–0.25*T to t0+0.25*T, the bias maintaining stage Td is enabled to meet different display control requirements on the premise of within the first non-light emission stage Tb.

In an optional embodiment, after the duration of the bias maintaining stage is determined, the duration t of the bias maintaining stage may further be corrected according to a correction relation of a duration of the bias maintaining stage, to determine a corrected duration t' of the bias maintaining stage.

Where, the correction relation of a duration of the bias maintaining stage is:

$$t'=\left[\frac{t-t1}{H}\right]*H+t1,$$

or, $$t'=\left[\frac{t-t1}{H}\right]*H+t1+H,$$

where, $$\left[\frac{t-t1}{H}\right]$$

is a rounded down value of $$\frac{t-t1}{H},$$

H=1/(F*Lines), F is a refresh rate of the display panel, and Lines is the number of lines of the pixel circuits in the display panel.

Exemplarily, in a case where the bias adjustment module includes a bias adjustment transistor, and the bias adjustment transistor is turned on or off under the control of the bias adjustment control signal, the bias adjustment control signal is provided by the corresponding shift register circuit. The bias adjustment control signals output by the shift register units of the shift register circuit can be used to scan the pixel circuits line by line, and the times for the shift register circuit to scan the lines of the pixel circuits are controlled by corresponding horizontal synchronization signals, in this case, a duration t of a bias maintaining stage may be determined according to the above linear relation between the brightness and the bias maintaining stage, to further determine a start moment and an end moment of the bias adjustment stage. However, since there is a case where the duration t of the bias maintaining stage is not an integer multiple of the scanning duration for scanning one line of pixel circuits, in this way, when to switch the mode of the display panel, a complicated control method is required to implement the translation of the bias adjustment stage.

Based on the foregoing issues, after the duration of the bias maintaining stage corresponding to the current frame image is determined, the correction relation of the duration of the bias maintaining stage may be used to correct the duration t of the bias maintaining stage Td calculated by using the above linear relation between the brightness and the bias maintaining stage, to allow the corrected duration t' of the bias maintaining stage Td to be an integer multiple of the duration H for scanning one line of pixel circuits, thus, when to switch the mode of the display panel, the length of the horizontal synchronization signal is not required to be changed, and it is only required to simply translate certain control signal or signals provided to the shift register circuit, the switching may just be realized, which further facilitates the simplification of the control manner of the display panel, improvement of the mode switching speed of the display panel, and facilitates meeting the high quality display requirements of the display panel.

It is to be noted that, the durations of the bias maintaining stages in various display brightnesses DBV may be determined by using the relation satisfied by the duration t of the bias maintaining stage and the display brightness DBV. Generally, the display brightnesses of the display panel have N levels, for example, N may be equal to 4096, each level corresponds to one display brightness DBV, and if the duration of the bias maintaining stage is calculated for each level by using the above relation, the operation amount of the driving trip for performing the driving method for the display panel may be increased.

Figure 22:
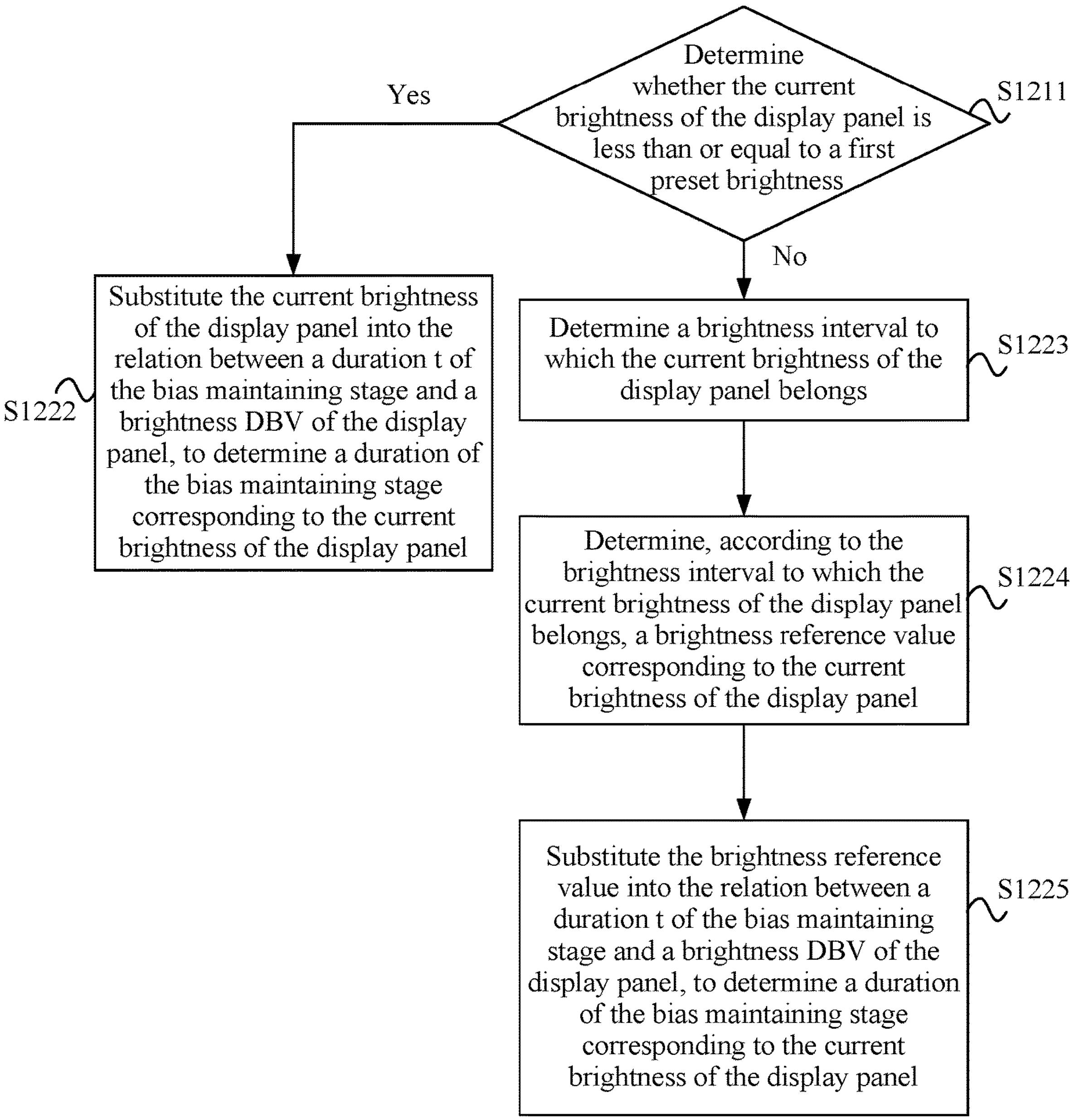
FIG. 22 is a schematic flowchart of another duration determining method for a bias maintaining stage according to an embodiment of the present disclosure.

In an optional embodiment, when to determine the duration of the bias maintaining stage corresponding to the current brightness of the display panel based on the relation between the duration t of the bias maintaining stage and the brightness DBV of the display panel, a brightness interval corresponding to the current brightness of the display panel may be determined first, and a brightness reference value corresponding to the brightness interval is then determined, the duration of the corresponding bias maintaining stage is determined based on the brightness reference value. FIG. 22 is a schematic flowchart of another duration determining method for a bias maintaining stage according to an embodiment of the present disclosure. The method further includes as follows.

In S1221, it is determined whether the current brightness of the display panel is less than or equal to a first preset brightness; if the current brightness of the display panel is less than or equal to the first preset brightness, S1222 is performed; and if the current brightness of the display panel is greater than the first preset brightness, S1223 is performed.

The first preset brightness may be a small brightness. In a case where the current display brightness of the display panel is less than the first preset brightness, a sensitivity of the human eye to a change of the brightness is relatively high. In this case, that is, when a driving current generated by the driving transistor changes slightly, the human eye can sense the change. In this case, corresponding adjustment may be performed on the bias situation of the driving transistor for each level of brightness. Exemplarily, the first preset brightness may be any brightness value between 50 nit-100 nit, for example, the first preset brightness is 50 nit, and when the brightness of the display panel is between 0-50 nit, the durations of the bias maintaining stages corresponding to the brightnesses may be determined separately according to all levels of the brightnesses respectively, so that bias adjustments to different degrees can be performed on the driving transistors. It is to be noted that, the above is only illustrative description for the value of the first preset brightness, and depending on the display requirements of the display panel, the first preset brightness may be a larger or smaller value, which is not specifically limited in embodiments of the present disclosure.

In S1222, the current brightness of the display panel is substituted into the relation between a duration t of the bias maintaining stage and a brightness DBV of the display panel, to determine a duration of the bias maintaining stage corresponding to the current brightness of the display panel.

Specifically, when it is determined that the current brightness of the display panel is less than or equal to the first preset brightness, the current brightness of the display panel may be directly substituted into the relation between the duration t of the bias maintaining stage and the brightness DBV of the display panel, so that the duration of the bias maintaining stage corresponding to the current display brightness is determined, to ensure that the bias situation of the driving transistor can be adjusted for the current brightness, so that the driving transistor can provide an accurate driving current to the light emitting element, to allow the light emitting element to emit light accurately.

In an exemplary embodiment, if the first preset brightness is 50 nit, and the current display brightness is 20 nit, the 20 nit may be directly substituted into the relation between the duration t of the bias maintaining stage and the brightness DBV of the display panel to calculate a corresponding duration to, and according to the calculated duration t0, a value range of the duration t of the bias maintaining stage corresponding to the current brightness DBV may be determined, that is, [t0−0.25*T and t0+0.25*T].

In S1223, a brightness interval to which the current brightness of the display panel belongs is determined.

In S1224, according to the brightness interval to which the current brightness of the display panel belongs, a brightness reference value corresponding to the current brightness of the display panel is determined.

The brightnesses greater than the first preset brightness form at least one brightness interval. Each of the brightness intervals includes at least two brightnesses with consecutive levels. The brightnesses in the same brightness interval correspond to the same brightness reference value; and the brightnesses in different brightness intervals correspond to different brightness reference values.

Specifically, when the current brightness is greater than the first preset brightness, the sensitivity of the human eye to the brightness changes jumpingly. Only the change of brightness across multiple brightnesses can be sensed by the human eye, that is, the sensitivity of the human eye to the change of the brightness in this case is relatively low. In this case, the bias situations of the driving transistor can be adjusted correspondingly for brightness intervals. That is, when it is determined that the current brightness is greater than the first preset brightness, the brightness interval to which the current brightness belongs is determined, and a duration of a corresponding bias maintaining stage is derived according to the brightness reference value in the brightness interval, and then bias adjustment is performed on the driving transistor. Based on this, the bias situation of the driving transistor is correspondingly adjusted for the brightness interval, such that the display effect of the display panel is ensured, moreover, the operation amount of the driving chip may be reduced, thereby improving the processing efficiency.

Exemplarily, the first preset brightness may be any brightness value in the range from 50 nit to 100 nit. It is taken as an example that the brightness of the display panel is 150 nit, and a brightness interval to which the brightness value 150 nit belongs is acquired as 100 nit-200 nit. Based on this, a brightness reference value of the determined brightness interval 100 nit-200 nit can be learned. It is taken as an example that the brightness reference value is 150 nit, and the 150 nit is substituted into a formula to obtain a duration of a corresponding bias maintaining stage, to further perform bias adjustment on the driving transistor. When the brightness interval is determined, the durations t of the bias maintaining stages of various display brightnesses DBV may not be adjusted level by level, and the duration t of the bias maintaining stage is obtained through the brightness reference value of the brightness interval, so that the amount of operation of the driving chip can be reduced and the operation rate and the processing efficiency can be improved.

In an optional embodiment, if the brightness interval includes a first brightness interval and a second brightness interval, and any brightness in the first brightness interval is less than any brightness in the second brightness interval, a brightness reference value corresponding to the second brightness interval should be greater than a brightness reference value corresponding to the first brightness interval.

Specifically, when the brightness in the first mode is less than the brightness in the second mode, and the brightness in the first mode belongs to the first brightness interval, and the brightness in the second mode belongs to the second brightness interval, a brightness reference value corresponding to the brightness in the first mode may be a first brightness reference value, and a brightness reference value corresponding to the brightness in the second mode may be a second brightness reference value. In this case, for a case where the driving transistor is a PMOS-type transistor, data signals corresponding to the same grayscale written to the driving transistor in the first mode and in the second mode are different, that is, the data signal written to the driving transistor in the first mode is greater than the data signal written to the driving transistor in the second mode, so that a threshold shift amount of the driving transistor in the first mode is less than a threshold shift amount of the driving transistor in the second mode. In this case, when to perform the bias adjustment, it may set that the duration of the bias maintaining stage in the first mode is less than the duration of the bias maintaining stage in the second mode. Based on the above relation, it may be learned that when the value substituted into the DBV is larger, the t0 calculated is smaller. Therefore, the brightness reference value corresponding to a brightness interval having a larger brightness is set greater than the brightness reference value corresponding to a brightness interval having a small brightness, thereby facilitating targeted adjustment on the bias situations of the driving transistor in brightnesses within different brightness intervals.

In an exemplary embodiment, when the first brightness interval ranges from 100 nit to 150 nit, and the second brightness interval ranges from 150 nit to 300 nit, the brightness reference value of the first brightness interval may be 100 nit, and the brightness reference value of the second brightness interval may be 150 nit.

It may be appreciated that illustrative description is made above by taking only it as an example that a brightness reference value corresponding to each brightness interval is a lower limit value of the respective brightness interval. In other embodiments, the brightness reference value corresponding to each brightness interval may be an upper limit value of the respective brightness interval. For example, the brightness reference value of the first brightness interval may be 150 nit, and the brightness reference value of the second brightness interval may be 300 nit. Alternatively, in other embodiments, the brightness reference value corresponding to each brightness interval may be an intermediate value of the respective brightness interval. For example, the brightness reference value of the first brightness interval may be 125 nit, and the brightness reference value of the second brightness interval may be 275 nit. Alternatively, in other embodiments, the brightness reference value corresponding to each brightness interval may also be an average value or the like of the brightnesses in the respective brightness interval, which is not specifically limited in embodiments of the present disclosure.

It is to be noted that the first brightness interval and the second brightness interval refer to not only two brightness intervals, but may refer to two different brightness intervals. Embodiments of the present disclosure use only the first brightness interval and the second brightness interval as examples for description.

In other optional embodiments, brightnesses that are greater than the first preset brightness may belong to the same brightness interval, and a brightness reference value corresponding to the brightness interval is the first preset brightness.

Specifically, at a relatively high display brightness, the sensitivity of the human eye to a change of the brightness is relatively low. Therefore, when the brightnesses in a current brightness interval exceed the first preset brightness, it may be considered that the brightnesses in the current operation mode are relatively high, and brightness changes caused by different degrees of biases of the driving transistor may not be sensed by the human eye. In this case, the brightnesses greater than the first preset brightness may be determined as one brightness interval. In this case, the brightnesses greater than the first preset brightness correspond to one brightness reference value, and the brightness reference value may be a lower limit of the brightness interval, that is, the first preset brightness. In this way, the display effect can be ensured, and also a calculation process of the duration t of the bias maintaining stage can be simplified, an operation amount of calculation of the driving chip can be reduced, and processing efficiency can be improved.

In S1225, the brightness reference value is substituted into the relation between the duration t of the bias maintaining stage and the brightness DBV of the display panel, to determine a duration of a bias maintaining stage corresponding to the current brightness of the display panel.

Specifically, each brightness interval includes at least two consecutive brightnesses. In this case, when the brightness of the display panel changes in a small range, it may be considered that the brightnesses of the display panel belong to the same brightness interval, and correspond to the same brightness reference value. A value range of the duration of the same bias maintaining stage may be calculated by using the brightness reference value, such that when the brightness of the display panel changes in a small range, the change of the brightness caused by the biases of the driving transistor may not be sensed by the human eye, and the display effect of the display panel can be ensured without adjusting the value range of the duration of the bias maintaining stage. In this way, after the brightness interval to which a current display brightness belongs is determined based on the current display brightness DBV, the brightness reference value corresponding to the brightness interval may be substituted into the above relation, so as to determine the duration t of the bias maintaining stage corresponding to the current brightness.

Optionally, when the brightness interval includes a first brightness interval and a second brightness interval, and brightnesses in the first brightness interval are less than brightnesses in the second brightness interval, the number of levels of the brightnesses included in the second brightness interval is greater than the number of levels of the brightnesses included in the first brightness interval.

Specifically, at a low brightness, the sensitivity of the human eye to a change of the brightness is relatively high, therefore, a small degree of fluctuation between brightness levels is less easily sensed by the human eye, however, a large degree of fluctuation between brightness levels can be sensed by the human eye. At a high brightness, the sensitivity of the human eye to a change of the brightness is relatively low, and even a large degree of fluctuation between brightness levels is not easily sensed by the human eye. In this way, when brightnesses in the first brightness interval are less than brightnesses in the second brightness interval, the numbers of brightness levels in different brightness intervals are set differentially, so that as brightness included in the brightness interval increases, the number of levels in the brightness interval is adaptively increased. For example, the number of levels in the first brightness interval is set to be less than the number of levels in the second brightness interval, so that adjustment to the duration of the bias maintaining stage is more roughly, thus, the cost of calculation for the durations of the bias maintaining stages may be reduced when the requirement of sensibility of the human eye to the display brightness is satisfied, and display effect of the display panel may also be ensured.

Exemplarily, the first brightness interval ranges from 100 nit to 150 nit, and 1000 brightness levels may be included in this brightness interval. The second brightness interval ranges from 150 nit to 300 nit, and 2000 brightness levels may be included in this brightness interval. That is, when brightnesses in the first brightness interval are less than brightnesses in the second brightness interval, brightness levels in the first brightness interval are also less than brightness levels in the second brightness interval, and embodiments of the present disclosure set no specific limitation on the size of the brightness interval and the number of brightness levels.

Based on the same inventive concept, a display apparatus is further provided according to embodiments of the present disclosure. The display apparatus includes the display panel according to the embodiments of the present disclosure. Therefore, the display apparatus has technical features of the display panel and the driving method according to the embodiments of the present disclosure, and can achieve beneficial effects of the display panel according to the embodiments of the present disclosure. For the similarities, reference may be made to the foregoing description of the display panel according to the embodiments of the present disclosure, and details are not described herein again.

Figure 23:
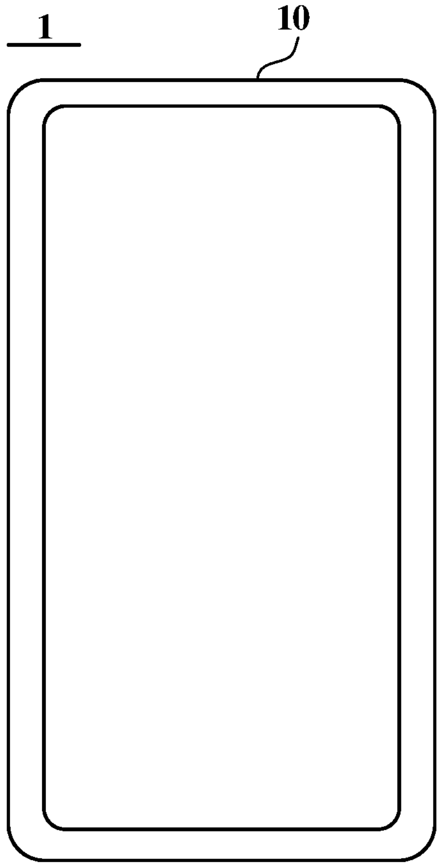
FIG. 23 is a schematic structural diagram of a display apparatus according to an embodiment of the present disclosure.

Exemplarily, FIG. 23 is a schematic structural diagram of a display apparatus according to an embodiment of the present disclosure. As shown in FIG. 23, the display apparatus 1 includes the display panel 10 according to embodiments of the present disclosure. The display apparatus 1 according to the embodiment of the present disclosure may be any electronic product with a display function, including but not limited to: phones, televisions, notebook computers, desktop displays, tablet computers, digital cameras, smart bracelets, smart glasses, in-vehicle displays, medical equipment, industry-controlling equipment, touch interactive terminals, etc., which will not be particularly limited in the embodiments of the present disclosure.

It should be appreciated that operation processes of the various forms of pixel circuits shown above may be used with the stages reordered, some added, or deleted. For example, the stages in the operation processes of the pixel circuits recorded in the present disclosure may be performed in parallel, may be performed in sequence, or may be performed in different sequences, which is not limited herein as long as the expected result of the technical solutions of the present disclosure can be realized.

The above-mentioned embodiments do not constitute a limitation on the protection scope of the present disclosure. It is to be appreciated by the person skilled in the art that various modifications, combinations, sub-combinations, and substitutions may be made according to design requirements and other factors. Any modifications, equivalent substitutions, improvements and the like within the spirit and principle of the present disclosure shall fall within the protection scope of the present disclosure.

What is claimed is:

1. A driving method for a display panel, wherein the display panel comprises pixel circuits and light-emitting elements, a pixel circuit of the pixel circuits comprises a driving module and a bias adjustment module; the driving module is configured to provide a driving current for a light-emitting element of the light-emitting elements at a light emission stage; and the driving module comprises a driving transistor; the bias adjustment module is configured to provide a bias adjustment signal for a source and/or a drain of the driving transistor in a bias adjustment stage; time of one frame image of the display panel comprises at least one light emission stage and at least one non-light emission stage; at least a part of at least one non-light emission stage is a first non-light emission stage; the first non-light emission stage comprises the bias adjustment stage; and in a same first non-light emission stage, time between an end moment of the bias adjustment stage and an end moment of the first non-light emission stage is a bias maintaining stage; and the driving method for the display panel comprises:

acquiring an operation mode of the display panel; wherein the operation mode comprises at least a first mode and a second mode that are different in brightness;

determining a duration of the bias adjustment stage and a duration of the bias maintaining stage according to the operation mode; wherein in a case where the operation mode of the display panel is the first mode and in a case where the display mode of the display panel is the second mode, at least one of durations of bias adjustment stages and durations of bias maintaining stages is different; and controlling, according to the duration of the bias adjustment stage and the duration of the bias maintaining stage, time for the bias adjustment module to provide a bias adjustment signal to the source and/or drain of the driving transistor.

2. The driving method for the display panel according to claim 1, wherein the determining a duration of the bias maintaining stage according to the operation mode comprises:

determining a current brightness of the display panel according to the operation mode; and determining, based on a relation between a duration t of the bias maintaining stage and a brightness DBV of the display panel, a duration of the bias maintaining stage corresponding to the current brightness of the display panel; wherein the relation between a duration t of the bias maintaining stage and a brightness DBV of the display panel is:

$$t - 0.25 * T \leq \left(\frac{t2 - t1}{DBV2 - DBV1}\right)(DBV - DBV1) + t1 \leq t + 0.25 * T,$$

wherein DBV1 is a brightness of the display panel in the first mode, and t1 is a duration of the bias maintaining stage in the first mode; DBV2 is a brightness of the display panel in the second mode, t2 is a duration of the bias maintaining stage in the second mode; and T is a duration of the first non-light emission stage.

3. The driving method for the display panel according to claim 2, wherein the determining, based on a relation between a duration t of the bias maintaining stage and a brightness DBV of the display panel, a duration of the bias maintaining stage corresponding to the current brightness of the display panel comprises:

determining whether the current brightness of the display panel is less than or equal to a first preset brightness; and if the current brightness of the display panel is less than or equal to the first preset brightness, substituting the current brightness of the display panel into the relation between the duration t of the bias maintaining stage and the brightness DBV of the display panel, to determine a duration of the bias maintaining stage corresponding to the current brightness of the display panel.

4. The driving method for the display panel according to claim 3, wherein the determining, based on a relation between a duration t of the bias maintaining stage and a brightness DBV of the display panel, a duration of the bias maintaining stage corresponding to the current brightness of the display panel further comprises:

if the current brightness of the display panel is greater than the first preset brightness, determining a brightness interval to which the current brightness of the display panel belongs; wherein the brightnesses greater than the first preset brightness form at least one brightness interval; the brightness interval comprises at least two brightnesses with consecutive levels; the brightnesses in a same brightness interval correspond to a same brightness reference value; and the brightnesses in different brightness intervals correspond to different brightness reference values;

determining, according to the brightness interval to which the current brightness of the display panel belongs, a brightness reference value corresponding to the current brightness of the display panel; and substituting the brightness reference value into the relation between the duration t of the bias maintaining stage and the brightness DBV of the display panel, to determine a duration of the bias maintaining stage corresponding to the current brightness of the display panel.

5. The driving method for the display panel according to claim 4, wherein the brightness interval comprises a first brightness interval and a second brightness interval; and brightnesses in the first brightness interval are less than brightnesses in the second brightness interval; and a number of levels of the brightnesses comprised in the second brightness interval is greater than a number of levels of the brightnesses comprised in the first brightness interval.

6. The driving method for the display panel according to claim 4, wherein the brightness interval comprises a first brightness interval and a second brightness interval; and brightnesses in the first brightness interval are less than brightnesses in the second brightness interval; and a brightness reference value corresponding to the second brightness interval is greater than a brightness reference value corresponding to the first brightness interval.

7. The driving method for the display panel according to claim 4, wherein brightnesses greater than the first preset brightness belong to a same brightness interval; and a brightness reference value corresponding to the brightness interval is the first preset brightness.

8. The driving method for the display panel according to claim 2, wherein after the determining a duration of the bias adjustment stage of the driving transistor according to the operation mode, the method further comprises:

correcting, based on a correction relation of a duration of the bias maintaining stage, the duration t of the bias maintaining stage, and determining a corrected duration t' of the bias maintaining stage; wherein the correction relation of a duration of the bias maintaining stage is:

$$t' = \left[\frac{t-t1}{H}\right] * H + t1,$$

or, $$t' = \left[\frac{t-t1}{H}\right] * H + t1 + H$$

wherein, $$\left[\frac{t-t1}{H}\right]$$

is a rounded down value of $$\frac{t-t1}{H},$$

H=1/(F*Lines), F is a refresh rate of the display panel, and Lines is a number of lines of the pixel circuits in the display panel.

9. A display panel, comprising:

pixel circuits and light-emitting elements, a pixel circuit of the pixel circuits comprises a driving module and a bias adjustment module; wherein the driving module is configured to provide a driving current for a light-emitting element of the light-emitting elements at a light emission stage; and the driving module comprises a driving transistor;

the bias adjustment module is configured to provide a bias adjustment signal for a source and/or drain of the driving transistor at a bias adjustment stage;

time of one frame image of the display panel comprises at least one light emission stage and at least one non-light emission stage; and at least a part of at least one non-light emission stage is a first non-light emission stage;

the first non-light emission stage comprises the bias adjustment stage; and in a same first non-light emission stage, time between an end moment of the bias adjustment stage and an end moment of the first non-light emission stage is a bias maintaining stage;

operation modes of the display panel comprise a first mode and a second mode; and a brightness of the display panel in the first mode is different from a brightness of the display panel in the second mode; and at least one of a duration of the bias adjustment stage in the first mode and a duration of the bias maintaining stage in the first mode is different from at least one of a duration of the bias adjustment stage in the second mode and a duration of the bias maintaining stage in the second mode.

10. The display panel according to claim 9, wherein the bias adjustment module is electrically connected between a bias adjustment signal terminal and a first electrode of the driving transistor; and the first electrode of the driving transistor is a source or a drain of the driving transistor;

the bias adjustment stage comprises at least two bias adjustment sub-stages; and in each of the bias adjustment sub-stages, the bias adjustment module is turned on; and during a time period between two adjacent bias adjustment sub-stages, the bias adjustment module is turned off.

11. The display panel according to claim 10, wherein a duration of each of the bias adjustment sub-stages in the first mode is the same as a duration of each of the bias adjustment sub-stages in the second mode; and a number of the bias adjustment sub-stages in the bias adjustment stage in the first mode is different from a number of the bias adjustment sub-stages in the bias adjustment stage in the second mode.

12. The display panel according to claim 10, wherein a duration of each of the bias adjustment sub-stages in the first mode is different from a duration of each of the bias adjustment sub-stages in the second mode; and a number of the bias adjustment sub-stages in the bias adjustment stage in the first mode is the same as a number of the bias adjustment sub-stages in the bias adjustment stage in the second mode.

13. The display panel according to claim 9, wherein a relation between a duration t of the bias maintaining stage and a brightness DBV of the display panel is:

$$t - 0.25 * T \leq \left(\frac{t2 - t1}{DBV2 - DBV1}\right)(DBV - DBV1) + t1 \leq t + 0.25 * T,$$

wherein DBV1 is a brightness of the display panel in the first mode, and t1 is a duration of the bias maintaining stage in the first mode; DBV2 is a brightness of the display panel in the second mode, and t2 is a duration of the bias maintaining stage in the second mode; and T is a duration of the first non-light emission stage.

14. The display panel according to claim 13, wherein a correction relation of a duration of the bias maintaining stage is:

$$t' = \left[\frac{t - t1}{H}\right] * H + t1,$$

or, $$t' = \left[\frac{t - t1}{H}\right] * H + t1 + H$$

wherein t' is a corrected duration of the bias maintaining stage, $$\left[\frac{t - t1}{H}\right]$$

is a rounded down value of $$\frac{t - t1}{H},$$

H=1/(F*Lines), F is a refresh rate of the display panel, and Lines is a number of lines of the pixel circuits in the display panel.

15. The display panel according to claim 9, wherein the pixel circuit further comprises a data writing module;

the data writing module is configured to provide a data signal to a gate of the driving transistor in a data writing stage;

one of the non-light emission stages of the time of one frame image of the display panel comprises the data writing stage; and in a same pixel circuit, time for the data writing stage and time for the bias adjustment stage do not overlap.

16. The display panel according to claim 15, wherein the data writing module further serves as the bias adjustment module.

17. The display panel according to claim 9, wherein in the same first non-light emission stage, the end moment of the bias adjustment stage is earlier than the end moment of the first non-light emission stage.

18. The display panel according to claim 9, wherein within the time of one frame image of the display panel, the first non-light emission stage is after at least a part of at least one light emission stage.

19. The display panel according to claim 9, wherein a voltage of the bias adjustment signal in the first mode is the same as a voltage of the bias adjustment signal in the second mode.

20. A display apparatus, comprising a display panel, wherein the display panel comprises pixel circuits and light-emitting elements, a pixel circuit of the pixel circuits comprises a driving module and a bias adjustment module;

the driving module is configured to provide a driving current for a light-emitting element of the light-emitting elements at a light emission stage; and the driving module comprises a driving transistor;

the bias adjustment module is configured to provide a bias adjustment signal for a source and/or drain of the driving transistor at a bias adjustment stage;

time of one frame image of the display panel comprises at least one light emission stage and at least one non-light emission stage; and at least a part of at least one non-light emission stage is a first non-light emission stage;

the first non-light emission stage comprises the bias adjustment stage; and in a same first non-light emission stage, time between an end moment of the bias adjustment stage and an end moment of the first non-light emission stage is a bias maintaining stage;

operation modes of the display panel comprise a first mode and a second mode; and a brightness of the display panel in the first mode is different from a brightness of the display panel in the second mode; and at least one of a duration of the bias adjustment stage in the first mode and a duration of the bias maintaining stage in the first mode is different from at least one of a duration of the bias adjustment stage in the second mode and a duration of the bias maintaining stage in the second mode.

* * * * *